US009042732B2

(12) United States Patent
Cune et al.

(10) Patent No.: US 9,042,732 B2
(45) Date of Patent: May 26, 2015

(54) PROVIDING DIGITAL DATA SERVICES IN OPTICAL FIBER-BASED DISTRIBUTED RADIO FREQUENCY (RF) COMMUNICATION SYSTEMS, AND RELATED COMPONENTS AND METHODS

(71) Applicants: William Patrick Cune, Charlotte, NC (US); Michael Sauer, Corning, NY (US); Wolfgang Gottfried Tobias Schweiker, Weyarn (DE)

(72) Inventors: William Patrick Cune, Charlotte, NC (US); Michael Sauer, Corning, NY (US); Wolfgang Gottfried Tobias Schweiker, Weyarn (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 13/785,603

(22) Filed: Mar. 5, 2013

(65) Prior Publication Data
US 2013/0188959 A1   Jul. 25, 2013

Related U.S. Application Data

(63) Continuation of application No. 12/892,424, filed on Sep. 28, 2010, now abandoned.

(60) Provisional application No. 61/330,386, filed on May 2, 2010.

(51) Int. Cl.
*H04B 10/2575* (2013.01)
*H04J 14/02* (2006.01)

(52) U.S. Cl.
CPC .......... *H04B 10/25753* (2013.01); *H04J 14/02* (2013.01); *H04J 14/0282* (2013.01); *H04J 14/0298* (2013.01)

(58) Field of Classification Search
CPC ..................... H04B 10/25753; H04B 10/2575; H04J 14/0282
USPC .......................................................... 398/115
See application file for complete search history.

(56) References Cited

U.S. PATENT DOCUMENTS 4,365,865 A   12/1982   Stiles
4,867,527 A    9/1989   Dotti et al.
(Continued)

FOREIGN PATENT DOCUMENTS

AU   645192 B2   1/1994
AU   731180 B2   3/2001
(Continued)

OTHER PUBLICATIONS

Author Unknown, "ADC Has 3rd Generation Services Covered at CeBIT 2001," Business Wire, Mar. 20, 2001, 3 pages.
(Continued)

*Primary Examiner* — Nathan Curs

(57) ABSTRACT

Optical fiber-based distributed communications systems that provide and support both RF communication services and digital data services are disclosed herein. The RF communication services and digital data services can be distributed over optical fiber to client devices, such as remote antenna units for example. In certain embodiments, digital data services can be distributed over optical fiber separate from optical fiber distributing RF communication services. In other embodiments, digital data services can be distributed over common optical fiber with RF communication services. For example, digital data services can be distributed over common optical fiber with RF communication services at different wavelengths through wavelength-division multiplexing (WDM) and/or at different frequencies through frequency-division multiplexing (FDM). Power distributed in the optical fiber-based distributed communications system to provide power to remote antenna units can also be accessed to provide power to digital data service components.

22 Claims, 15 Drawing Sheets

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,078,622 A | 6/2000 | Boytim et al. |
| 6,088,381 A | 7/2000 | Myers, Jr. |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,223,021 B1 | 4/2001 | Silvia et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |
| 6,549,772 B1 | 4/2003 | Chavez et al. |

(56) References Cited

U.S. PATENT DOCUMENTS

| | | |
|---|---|---|
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,106,931 B2 | 9/2006 | Sutehall et al. |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,457,646 B2 | 11/2008 | Mahany et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,496,070 B2 | 2/2009 | Vesuna |
| 7,496,384 B2 | 2/2009 | Seto et al. |
| 7,522,552 B2 | 4/2009 | Fein et al. |
| 7,542,452 B2 | 6/2009 | Penumetsa |
| 7,548,695 B2 | 6/2009 | Wake |
| 7,551,641 B2 | 6/2009 | Pirzada et al. |
| 7,552,246 B2 | 6/2009 | Mahany et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |

(56) References Cited

U.S. PATENT DOCUMENTS

| | | |
|---|---|---|
| 7,599,420 B2 | 10/2009 | Forenza et al. |
| 7,606,594 B2 | 10/2009 | Jesse et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,153 B2 | 2/2010 | Zavadsky |
| 7,668,565 B2 | 2/2010 | Ylänen et al. |
| 7,684,709 B2 | 3/2010 | Ray et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,715,466 B1 | 5/2010 | Oh et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,764,978 B1 | 7/2010 | West |
| 7,768,951 B2 | 8/2010 | Kubler et al. |
| 7,773,573 B2 | 8/2010 | Chung et al. |
| 7,778,603 B2 | 8/2010 | Palin et al. |
| 7,783,263 B2 | 8/2010 | Sperlich et al. |
| 7,809,012 B2 | 10/2010 | Ruuska et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,145 B2 | 3/2011 | Mahany et al. |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,042 B2 | 6/2011 | Deas |
| 7,962,176 B2 | 6/2011 | Li et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,005,152 B2 | 8/2011 | Wegener |
| 8,010,116 B2 | 8/2011 | Scheinert |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,213,401 B2 | 7/2012 | Fischer et al. |
| 8,270,387 B2 | 9/2012 | Cannon et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,929,288 B2 | 1/2015 | Stewart et al. |
| 2001/0036163 A1 | 11/2001 | Sabat, Jr. et al. |
| 2001/0053011 A1 | 12/2001 | Imajo |
| 2002/0003645 A1 | 1/2002 | Kim et al. |
| 2002/0012336 A1 | 1/2002 | Hughes et al. |
| 2002/0012495 A1 | 1/2002 | Sasai et al. |
| 2002/0031113 A1 | 3/2002 | Dodds et al. |
| 2002/0048071 A1 | 4/2002 | Suzuki et al. |
| 2002/0055371 A1 | 5/2002 | Arnon et al. |
| 2002/0075906 A1 | 6/2002 | Cole et al. |
| 2002/0090915 A1 | 7/2002 | Komara et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078052 A1 | 4/2003 | Atias et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0100930 A1 | 5/2004 | Shapira et al. |
| 2004/0106435 A1 | 6/2004 | Bauman et al. |
| 2004/0110469 A1 | 6/2004 | Judd et al. |
| 2004/0126068 A1 | 7/2004 | Van Bijsterveld |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0198451 A1 | 10/2004 | Varghese |
| 2004/0202257 A1 | 10/2004 | Mehta et al. |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |

(56) References Cited

U.S. PATENT DOCUMENTS

| | | |
|---|---|---|
| 2005/0219050 A1 | 10/2005 | Martin |
| 2005/0224585 A1 | 10/2005 | Durrant et al. |
| 2005/0226625 A1* | 10/2005 | Wake et al. ............... 398/115 |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0045054 A1 | 3/2006 | Utsumi et al. |
| 2006/0062579 A1 | 3/2006 | Kim et al. |
| 2006/0079290 A1 | 4/2006 | Seto et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0233506 A1 | 10/2006 | Noonan et al. |
| 2006/0239630 A1 | 10/2006 | Hase et al. |
| 2006/0274704 A1 | 12/2006 | Desai et al. |
| 2007/0008939 A1 | 1/2007 | Fischer |
| 2007/0009266 A1 | 1/2007 | Bothwell et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0208961 A1 | 9/2007 | Ghoshal et al. |
| 2007/0224954 A1 | 9/2007 | Gopi |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0274279 A1 | 11/2007 | Wood et al. |
| 2007/0297005 A1 | 12/2007 | Montierth et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159226 A1 | 7/2008 | He et al. |
| 2008/0159744 A1 | 7/2008 | Soto et al. |
| 2008/0181282 A1 | 7/2008 | Wala et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1* | 4/2009 | Gray ............................. 398/58 |
| 2009/0088072 A1 | 4/2009 | Rofougaran et al. |
| 2009/0092394 A1* | 4/2009 | Wei et al. ................... 398/79 |
| 2009/0097855 A1 | 4/2009 | Thelen et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0290632 A1 | 11/2009 | Wegener |
| 2010/0002626 A1 | 1/2010 | Schmidt et al. |
| 2010/0002661 A1 | 1/2010 | Schmidt et al. |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |

(56) References Cited

U.S. PATENT DOCUMENTS

| | | |
|---|---|---|
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0141895 A1 | 6/2011 | Zhang |
| 2011/0149879 A1 | 6/2011 | Noriega et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1* | 10/2011 | Badinelli .................. 340/541 |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2013/0012195 A1 | 1/2013 | Sabat, Jr. et al. |
| 2013/0150063 A1 | 6/2013 | Berlin et al. |
| 2013/0210490 A1 | 8/2013 | Fischer et al. |
| 2014/0016583 A1 | 1/2014 | Smith |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |

FOREIGN PATENT DOCUMENTS

| | | |
|---|---|---|
| CA | 2065090 C | 2/1998 |
| CA | 2242707 C | 9/2002 |
| CN | 1745560 A | 3/2006 |
| CN | 101151811 A | 3/2008 |
| CN | 101496306 A | 7/2009 |
| CN | 101542928 A | 9/2009 |
| DE | 19705253 A1 | 8/1998 |
| DE | 20104862 U1 | 9/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0477952 A3 | 4/1992 |
| EP | 0714218 A1 | 5/1996 |
| EP | 0687400 B1 | 11/1998 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1356783 A2 | 10/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 2110955 A1 | 10/2009 |
| EP | 1570626 B1 | 11/2013 |
| GB | 2323252 A | 9/1998 |
| GB | 2366131 A | 2/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 | 6/1997 |
| JP | 09200840 | 7/1997 |
| JP | 11068675 | 3/1999 |
| JP | 11088265 A | 3/1999 |
| JP | 2000152300 | 5/2000 |
| JP | 2000341744 | 12/2000 |
| JP | 2002264617 | 9/2002 |
| JP | 2003148653 | 5/2003 |
| JP | 2003172827 | 6/2003 |
| JP | 2004172734 | 6/2004 |
| JP | 2004245963 | 9/2004 |
| JP | 2004247090 | 9/2004 |
| JP | 2004264901 A | 9/2004 |
| JP | 2004265624 | 9/2004 |
| JP | 2004317737 A | 11/2004 |
| JP | 2004349184 A | 12/2004 |
| JP | 2005018175 | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| WO | 9603823 A1 | 2/1996 |
| WO | 9935788 A2 | 7/1999 |
| WO | 0042721 A1 | 7/2000 |
| WO | 0178434 A1 | 10/2001 |
| WO | 0184760 A1 | 11/2001 |
| WO | 0221183 A2 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |

(56) References Cited

FOREIGN PATENT DOCUMENTS

| | | | |
|---|---|---|---|
| WO | 2006039941 A1 | 4/2006 |
| WO | 2006046088 A1 | 5/2006 |
| WO | 2006051262 A1 | 5/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | 2010090999 A1 | 8/2010 |
| WO | 2011139937 A1 | 11/2011 |
| WO | 2011139942 A1 | 11/2011 |
| WO | 2013122915 A1 | 8/2013 |

OTHER PUBLICATIONS

Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Fitzmaurice, M. et al., "Distributed Antenna System for Mass Transit Communications," Vehicular Technology Conference, Boston, Massachusetts, Sep. 2000, IEEE, pp. 2011-2018.

Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.

Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.

Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.

Lee, D. et al., "Ricocheting Bluetooth," 2nd International Conference on Microwave and Millimeter Wave Technology Proceedings, Beijing, China, Sep. 2000, IEEE, pp. 432-435.

Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.

Schuh et al., "Hybrid Fibre Radio Access: A Network Operators Approach and Requirements," Proceedings of the 10th Microcoll Conference, Mar. 21-24, 1999, Budapest, Hungary, pp. 211-214.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Margotte, B. et al., "Fibre Optic Distributed Antenna System for Cellular and PCN/PCS Indoor Coverage," Microwave Engineering Europe, Jun. 1998, 6 pages.

Matsunaka et al., "Point-to-multipoint Digital Local Distribution Radio System in the 21 GHz Band," KDD Technical Journal, Mar. 1991, No. 145, p. 43-54.

Parker et al., "Radio-over-fibre technologies arising from the Building the future Optical Network in Europe (BONE) project," IET Optoelectron., 2010, vol. 4, Issue 6, pp. 247-259.

Singh et al., "Distributed coordination with deaf neighbors: efficient medium access for 60 GHz mesh networks," IEEE INFOCOM 2010 proceedings, 9 pages.

Notification of Grant for Chinese patent application 201190000473.1 issued Aug. 28, 2013, 4 pages.

International Search Report for PCT/US2011/034725 mailed Aug. 5, 2011, 4 pages.

Non-final Office Action for U.S. Appl. No. 12/892,424 mailed Nov. 5, 2012, 22 pages.

International Search Report and Written Opinion for PCT/US2011/034738 mailed Jul. 27, 2011, 13 pages.

International Search Report for PCT/US2011/047821 mailed Oct. 25, 2011, 4 pages.

International Preliminary Report on Patentability for PCT/US2011/047821 mailed Feb. 19, 2013, 10 pages.

Non-final Office Action for U.S. Appl. No. 13/025,719 mailed Sep. 11, 2013, 18 pages.

Cooper, A.J., "Fibre/Radio for the Provision of Cordless/Mobile Telephony Services in the Access Network," Electronics Letters, 1990, pp. 2054-2056, vol. 26, No. 24.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

International Search Report for PCT/US07/21041 mailed Mar. 7, 2008, 3 pages.

No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.

No Author, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 19 pages.

Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2002, pp. 271-282.

Roh, W., et al., "MIMO Channel Capacity for the Distributed Antenna Systems," Proceedings of the 56th IEEE Vehicular Technology Conference, Sep. 2002, vol. 2, pp. 706-709.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific Conference on Communications, Sep. 21-24, 2003, vol. 1, pp. 113-118.

Wake, D. et al., "Passive Picocell: A New Concept in Wireless Network Infrastructure," Electronics Letters, Feb. 27, 1997, vol. 33, No. 5, pp. 404-406.

(56) References Cited

OTHER PUBLICATIONS

Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
Opatic, D., "Radio over Fiber Technology for Wireless Access," Ericsson, Oct. 17, 2009, 6 pages.
Examination Report for European patent application 11754570.7 mailed Nov. 18, 2013, 7 pages.
Final Office Action for U.S. Appl. No. 13/025,719 mailed Dec. 31, 2013, 20 pages.
Advisory Action for U.S. Appl. No. 13/025,719 mailed Mar. 14, 2014, 6 pages.
Non-final Office Action for U.S. Appl. No. 13/762,432 mailed Aug. 20, 2014, 4 pages.
Notice of Allowance for U.S. Appl. No. 13/762,432 mailed Dec. 24, 2014, 7 pages.
Non-final Office Action for U.S. Appl. No. 13/967,426 mailed Dec. 26, 2014, 15 pages.
First Office Action for Chinese patent application 201180024499.4 mailed Dec. 1, 2014, 13 pages.
Examination Report for European patent application 11754570.7 mailed Jan. 13, 2015, 5 pages.
Translation of the First Office Action for Chinese patent application 201180039569.3 issued Jan. 16, 2015, 7 pages.
Non-final Office Action for U.S. Appl. No. 13/025,719 mailed Mar. 31, 2015, 26 pages.

\* cited by examiner

PROVIDING DIGITAL DATA SERVICES IN OPTICAL FIBER-BASED DISTRIBUTED RADIO FREQUENCY (RF) COMMUNICATION SYSTEMS, AND RELATED COMPONENTS AND METHODS

RELATED APPLICATIONS

This application is a continuation of U.S. patent application Ser. No. 12/892,424 filed on Sep. 28, 2010, which claims priority to U.S. Provisional Patent Application Ser. No. 61/330,386 filed on May 2, 2010, the content of which are relied upon incorporated herein by reference in their entireties.

The present application is related to U.S. Provisional Patent Application No. 61/330,385 filed on May 2, 2010 entitled, "Power Distribution in Optical Fiber-based Distributed Communications Systems Providing Digital Data and Radio Frequency (RF) Communications Services, and Related Components and Methods," which is incorporated herein by reference in its entirety.

The present application is also related to U.S. Provisional Patent Application No. 61/330,383 filed on May 2, 2010 entitled, "Optical Fiber-based Distributed Communications Systems, and Related Components and Methods," which is incorporated herein by reference in its entirety.

BACKGROUND

1. Field of the Disclosure

The technology of the disclosure relates to optical fiber-based distributed communications systems for distributing radio frequency (RF) signals over optical fiber.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications systems communicate with wireless devices called "clients," which must reside within the wireless range or "cell coverage area" in order to communicate with an access point device.

One approach to deploying a distributed communications system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed communications system access to clients within the building or facility. However, it may be desirable to employ optical fiber to distribute communication signals. Benefits of optical fiber include increased bandwidth.

One type of distributed communications system for creating antenna coverage areas, called "Radio-over-Fiber" or "RoF," utilizes RF signals sent over optical fibers. Such systems can include a head-end station optically coupled to a plurality of remote antenna units that each provides antenna coverage areas. The remote antenna units can each include RF transceivers coupled to an antenna to transmit RF signals wirelessly, wherein the remote antenna units are coupled to the head-end station via optical fiber links. The RF transceivers in the remote antenna units are transparent to the RF signals. The remote antenna units convert incoming optical RF signals from an optical fiber downlink to electrical RF signals via optical-to-electrical (O/E) converters, which are then passed to the RF transceiver. The RF transceiver converts the electrical RF signals to electromagnetic signals via antennas coupled to the RF transceiver provided in the remote antenna units. The antennas also receive electromagnetic signals (i.e., electromagnetic radiation) from clients in the antenna coverage area and convert them to electrical RF signals (i.e., electrical RF signals in wire). The remote antenna units then convert the electrical RF signals to optical RF signals via electrical-to-optical (E/O) converters. The optical RF signals are then sent over an optical fiber uplink to the head-end station.

SUMMARY OF THE DETAILED DESCRIPTION

Embodiments disclosed in the detailed description include optical fiber-based distributed communications systems that provide and support both radio frequency (RF) communication services and digital data services. The RF communication services and digital data services can be distributed over optical fiber to client devices, such as remote antenna units for example. Digital data services can be distributed over optical fiber separate from optical fiber distributing RF communication services. Alternatively, digital data services can be distributed over common optical fiber with RF communication services. For example, digital data services can be distributed over common optical fiber with RF communication services at different wavelengths through wavelength-division multiplexing (WDM) and/or at different frequencies through frequency-division multiplexing (FDM). Power distributed in the optical fiber-based distributed communications system to provide power to remote antenna units can also be accessed to provide power to digital data service components.

In one embodiment, a distributed antenna system for distributing RF communications and digital data services (DDS) to at least one remote antenna unit (RAU) is provided. The distributed antenna system includes a head-end unit (HEU). The HEU is configured to receive at least one downlink electrical RF communications signal. The HEU is also configured to convert the at least one downlink electrical RF communications signal into at least one downlink optical RF communications signal to be communicated over at least one communications downlink to the at least one RAU. The HEU is also configured to receive at least one uplink optical RF communications signal over at least one communications uplink from the at least one RAU. The HEU is also configured to convert the at least one uplink optical RF communications signal into at least one uplink electrical RF communications signal. The distributed antenna system also includes a DDS controller. The DDS controller is configured to receive at least one downlink optical digital signal containing at least one DDS, and provide the at least one downlink optical digital signal over at least one second communications downlink to the at least one RAU.

In another embodiment, a method of distributing RF communications and DDS to at least one RAU in a distributed antenna system is provided. The method includes receiving at an HEU at least one downlink electrical RF communications signal. The method also includes converting the at least one downlink electrical RF communications signal into at least one downlink optical RF communications signal to be communicated over at least one communications downlink to the at least one RAU. The method also includes receiving at the HEU at least one uplink optical RF communications signal over at least one communications uplink from the at least one RAU. The method also includes converting the at least one uplink optical RF communications signal into at least one uplink electrical RF communications signal. The method also includes receiving at a DDS controller at least one downlink optical digital signal containing at least one DDS, and providing the at least one downlink optical digital signal over at least one second communications downlink to the at least one RAU.

In another embodiment, an RAU for use in a distributed antenna system is provided. The RAU includes an optical-to-electrical (O-E) converter configured to convert received downlink optical RF communications signals to downlink electrical RF communications signals and provide the downlink electrical RF communications signals at least one first port. The RAU also includes an electrical-to-optical (E-O) converter configured to convert uplink electrical RF communications signals received from the at least one first port into uplink optical RF communications signals. The RAU also includes a DDS interface coupled to at least one second port. The DDS interface is configured to convert downlink optical digital signals into downlink electrical digital signals to provide to the at least one second port, and convert uplink electrical digital signals received from the at least one second port into uplink optical digital signals.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include optical fiber-based distributed communications systems that provide and support both radio frequency (RF) communication services and digital data services. The RF communication services and digital data services can be distributed over optical fiber to client devices, such as remote antenna units for example. For example, non-limiting examples of digital data services include Ethernet, WLAN, Worldwide Interoperability for Microwave Access (WiMax), Wireless Fidelity (WiFi), Digital Subscriber Line (DSL), and Long Term Evolution (LTE), etc. Digital data services can be distributed over optical fiber separate from optical fiber distributing RF communication services. Alternatively, digital data services can be distributed over common optical fiber with RF communication services. For example, digital data services can be distributed over common optical fiber with RF communication services at different wavelengths through wavelength-division multiplexing (WDM) and/or at different frequencies through frequency-division multiplexing (FDM). Power distributed in the optical fiber-based distributed communications system to provide power to remote antenna units can also be accessed to provide power to digital data service components.

Figure 1:
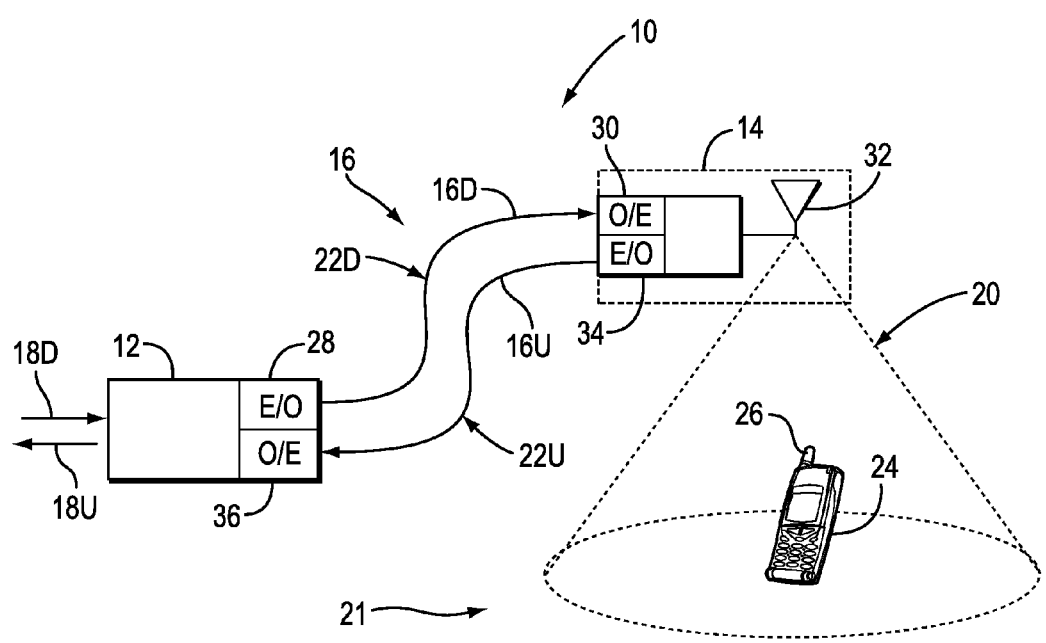
FIG. 1 is a schematic diagram of an exemplary optical fiber-based distributed communications system.
Figure 2:
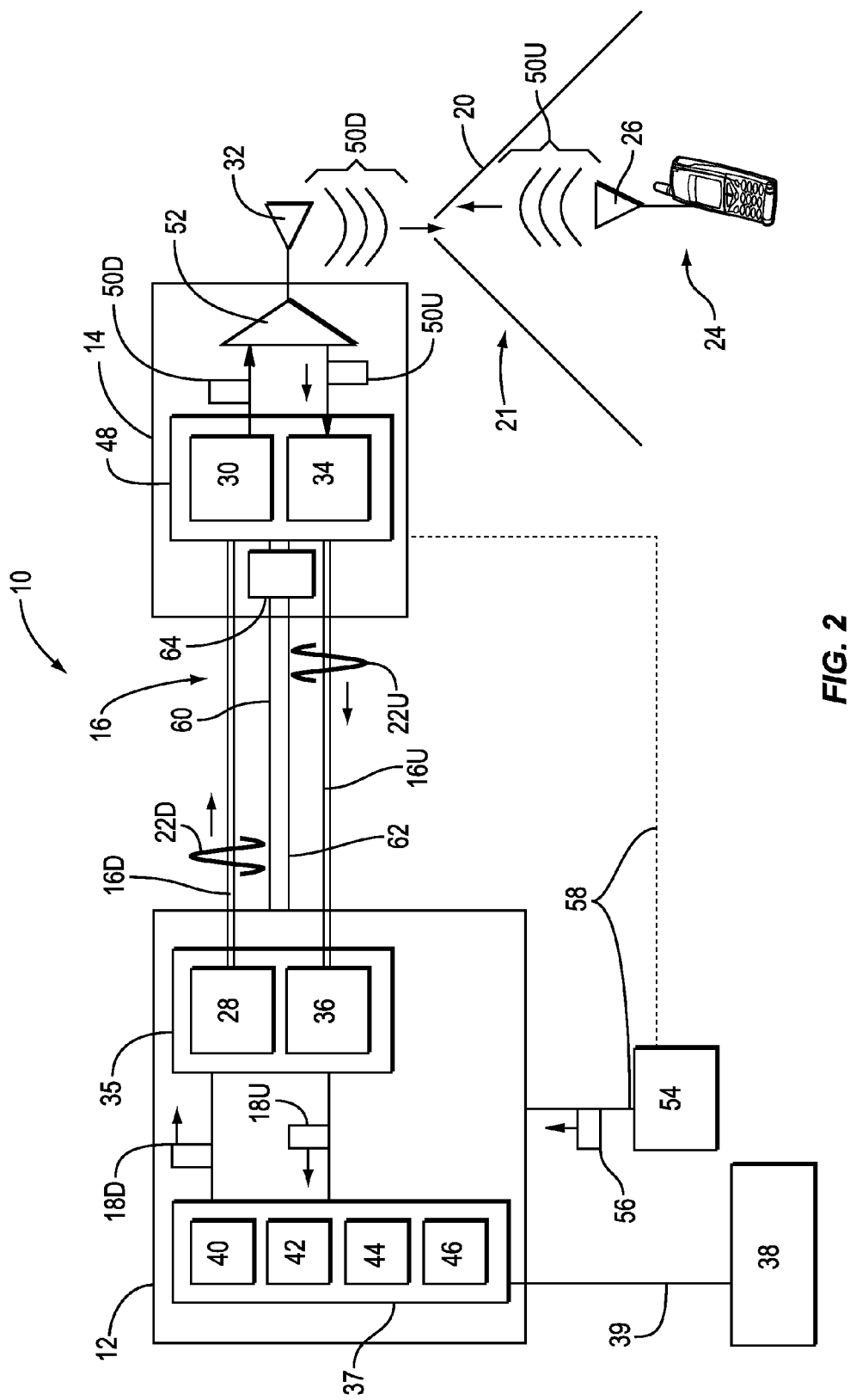
FIG. 2 is a more detailed schematic diagram of an exemplary head-end unit (HEU) and a remote antenna unit (RAU) that can be deployed in the optical fiber-based distributed communications system of FIG. 1.
Figure 3:
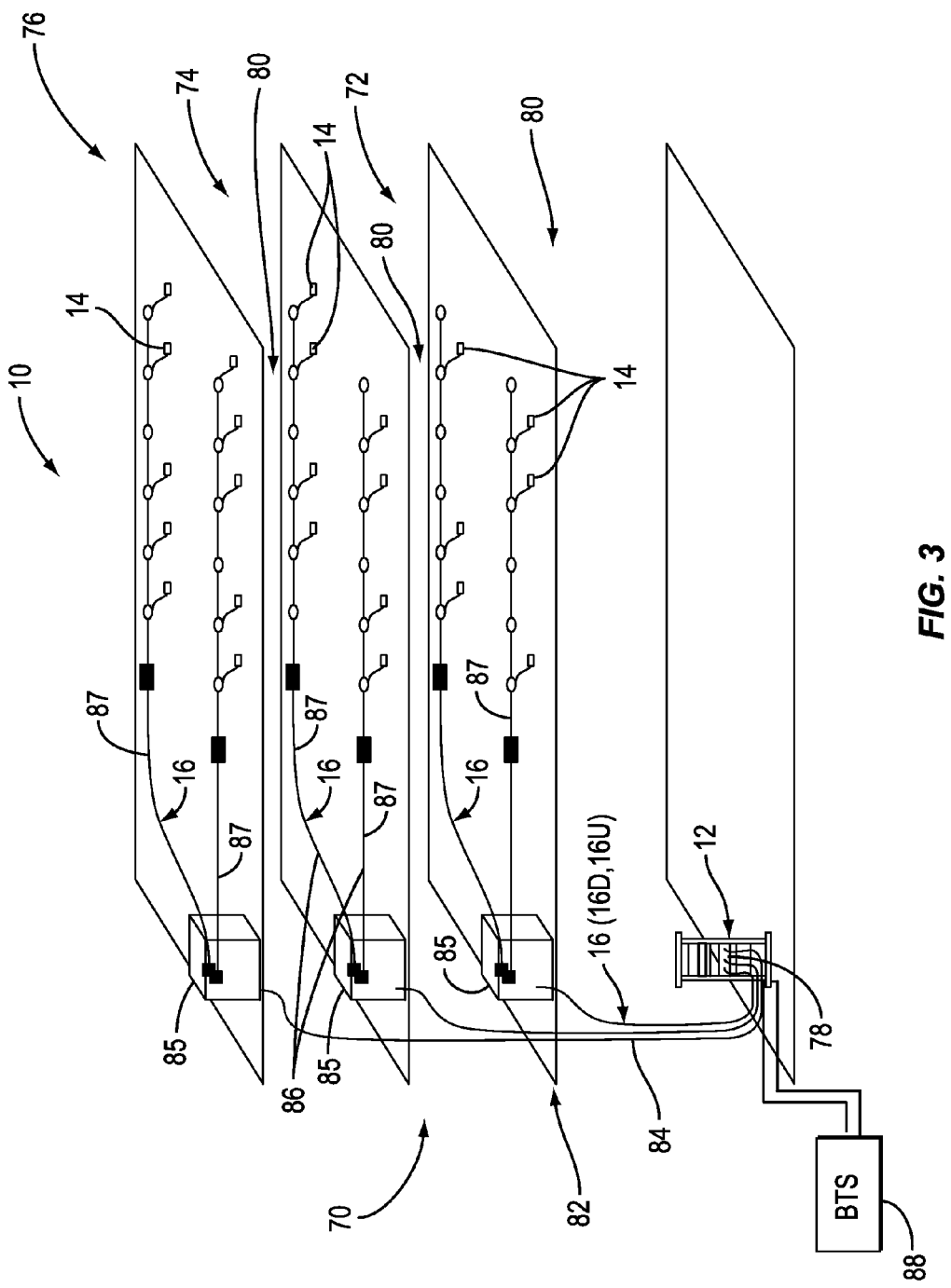
FIG. 3 is a partially schematic cut-away diagram of an exemplary building infrastructure in which the optical fiber-based distributed communications system in FIG. 1 can be employed.

In this regard, an exemplary optical fiber-based distributed communications system that provides RF communication services without providing digital data services is described with regard to FIGS. 1-3. Various embodiments of additionally providing digital data services in conjunction with RF communication services in optical fiber-based distributed communications systems starts at FIG. 4.

In this regard, FIG. 1 is a schematic diagram of an embodiment of an optical fiber-based distributed communications system. In this embodiment, the system is an optical fiber-based distributed communications system 10 that is configured to create one or more antenna coverage areas for establishing communications with wireless client devices located in the radio frequency (RF) range of the antenna coverage areas. The optical fiber-based distributed communications system 10 provides RF communications service (e.g., cellular services). In this embodiment, the optical fiber-based distributed communications system 10 includes a head-end unit (HEU) 12, one or more remote antenna units (RAUs) 14, and an optical fiber 16 that optically couples the HEU 12 to the RAU 14. The HEU 12 is configured to receive communications over downlink electrical RF signals 18D from a source or sources, such as a network or carrier as examples, and provide such communications to the RAU 14. The HEU 12 is also configured to return communications received from the RAU 14, via uplink electrical RF signals 18U, back to the source or sources. In this regard in this embodiment, the optical fiber 16 includes at least one downlink optical fiber 16D to carry signals communicated from the HEU 12 to the RAU 14 and at least one uplink optical fiber 16U to carry signals communicated from the RAU 14 back to the HEU 12.

The optical fiber-based distributed communications system 10 has an antenna coverage area 20 that can be substantially centered about the RAU 14. The antenna coverage area 20 of the RAU 14 forms an RF coverage area 21. The HEU 12 is adapted to perform or to facilitate any one of a number of Radio-over-Fiber (RoF) applications, such as radio frequency (RF) identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E-O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E-O converter 34 converts the electrical RF signals into uplink optical RF signals 22U to be communicated over the uplink optical fiber 16U. An O/E converter 36 provided in the HEU 12 converts the uplink optical RF signals 22U into uplink electrical RF signals, which can then be communicated as uplink electrical RF signals 18U back to a network or other source. The HEU 12 in this embodiment is not able to distinguish the location of the client devices 24 in this embodiment. The client device 24 could be in the range of any antenna coverage area 20 formed by an RAU 14.

FIG. 2 is a more detailed schematic diagram of the exemplary optical fiber-based distributed communications system of FIG. 1 that provides electrical RF service signals for a particular RF service or application. In an exemplary embodiment, the HEU 12 includes a service unit 37 that provides electrical RF service signals by passing (or conditioning and then passing) such signals from one or more outside networks 38 via a network link 39. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E-O converter 28 that receives the downlink electrical RF signals 18D from the service unit 37 and converts them to corresponding downlink optical RF signals 22D. In an exemplary embodiment, the E-O converter 28 includes a laser suitable for delivering sufficient dynamic range for the RoF applications described herein, and optionally includes a laser driver/amplifier electrically coupled to the laser. Examples of suitable lasers for the E-O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEU 12 also includes the O-E converter 36, which is electrically coupled to the service unit 37. The O-E converter 36 receives the uplink optical RF signals 22U and converts them to corresponding uplink electrical RF signals 18U. In an example embodiment, the O-E converter 36 is a photodetector, or a photodetector electrically coupled to a linear amplifier. The E-O converter 28 and the O-E converter 36 constitute a "converter pair" 35, as illustrated in FIG. 2.

In accordance with an exemplary embodiment, the service unit 37 in the HEU 12 can include an RF signal modulator/demodulator unit 40 for modulating/demodulating the downlink electrical RF signals 18D and the uplink electrical RF signals 18U, respectively. The service unit 37 can include a digital signal processing unit ("digital signal processor") 42 for providing to the RF signal modulator/demodulator unit 40 an electrical signal that is modulated onto an RF carrier to generate a desired downlink electrical RF signal 18D. The digital signal processor 42 is also configured to process a demodulation signal provided by the demodulation of the uplink electrical RF signal 18U by the RF signal modulator/demodulator unit 40. The HEU 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O-E converter 30 and the E-O converter 34. The O-E converter 30 converts the received downlink optical RF signals 22D from the HEU 12 back into downlink electrical RF signals 50D. The E-O converter 34 converts uplink electrical RF signals 50U received from the client device 24 into the uplink optical RF signals 22U to be communicated to the HEU 12. The O-E converter 30 and the E-O converter 34 are electrically coupled to the antenna 32 via an RF signal-directing element 52, such as a circulator for example. The RF signal-directing element 52 serves to direct the downlink electrical RF signals 50D and the uplink electrical RF signals 50U, as discussed below. In accordance with an exemplary embodiment, the antenna 32 can include one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-Based Wireless Picocellular Systems and Methods," both of which are incorporated herein by reference in their entireties.

With continuing reference to FIG. 2, the optical fiber-based distributed communications system 10 also includes a power supply 54 that generates an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O-E converter 30 and the E-O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and that are electrically coupled to a DC power converter 64 at the RAU 14. The DC power converter 64 is electrically coupled to the O-E converter 30 and the E-O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEU 12. In another example embodiment, the electrical power line 58 includes more than two wires and carries multiple voltages.

To provide further exemplary illustration of how an optical fiber-based distributed communications system can be deployed indoors, FIG. 3 is provided. FIG. 3 is a partially schematic cut-away diagram of a building infrastructure 70 employing an optical fiber-based distributed communications system. The system may be the optical fiber-based distributed communications system 10 of FIGS. 1 and 2. The building infrastructure 70 generally represents any type of building in which the optical fiber-based distributed communications system 10 can be deployed. As previously discussed with regard to FIGS. 1 and 2, the optical fiber-based distributed communications system 10 incorporates the HEU 12 to provide various types of communication services to coverage areas within the building infrastructure 70, as an example. For example, as discussed in more detail below, the optical fiber-based distributed communications system 10 in this embodiment is configured to receive wireless RF signals and convert the RF signals into RoF signals to be communicated over the optical fiber 16 to multiple RAUs 14. The optical fiber-based distributed communications system 10 in this embodiment can be, for example, an indoor distributed antenna system (IDAS) to provide wireless service inside the building infrastructure 70. These wireless signals can include cellular service, wireless services such as RFID tracking, Wireless Fidelity (WiFi), local area network (LAN), WLAN, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEU 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87 and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables multiple optical fiber cables 86 to be distributed throughout the building infrastructure 70 (e.g., fixed to the ceilings or other support surfaces of each floor 72, 74, 76) to provide the antenna coverage areas 80 for the first, second and third floors 72, 74 and 76. In an example embodiment, the HEU 12 is located within the building infrastructure 70 (e.g., in a closet or control room), while in another example embodiment the HEU 12 may be located outside of the building infrastructure 70 at a remote location. A base transceiver station (BTS) 88, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell.

The optical fiber-based distributed communications system 10 in FIGS. 1-3 and described above provides point-to-point communications between the HEU 12 and the RAU 14. Each RAU 14 communicates with the HEU 12 over a distinct downlink and uplink optical fiber pair to provide the point-to-point communications. Whenever an RAU 14 is installed in the optical fiber-based distributed communications system 10, the RAU 14 is connected to a distinct downlink and uplink optical fiber pair connected to the HEU 12. The downlink and uplink optical fibers may be provided in the optical fiber 16. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14.

It may be desirable to provide both digital data services and RF communication services for client devices. For example, it may be desirable to provide digital data services and RF communication services in the building infrastructure 70 to client devices located therein. Wired and wireless devices may be located in the building infrastructure 70 that are configured to access digital data services. Examples of digital data services include, but are not limited to, Ethernet, WLAN, WiMax, WiFi, DSL, and LTE, etc. Ethernet standards could be supported, including but not limited to 100 Megabits per second (Mbs) (i.e., fast Ethernet) or Gigabit (Gb) Ethernet, or ten Gigabit (10 G) Ethernet. Example of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

In this regard, embodiments disclosed herein provide optical fiber-based distributed communications systems that support both RF communication services and digital data services. The RF communication services and digital data services can be distributed over optical fiber to client devices, such as remote antenna units for example. Digital data services can be distributed over optical fiber separate from the optical fiber distributing RF communication services. Alternatively, digital data services can be both distributed over common optical fiber with RF communication services in an optical fiber-based distributed communications system. For example, digital data services can be distributed over common optical fiber with RF communication services at different wavelengths through wavelength-division multiplexing (WDM) and/or at different frequencies through frequency-division multiplexing (FDM).

Figure 4:
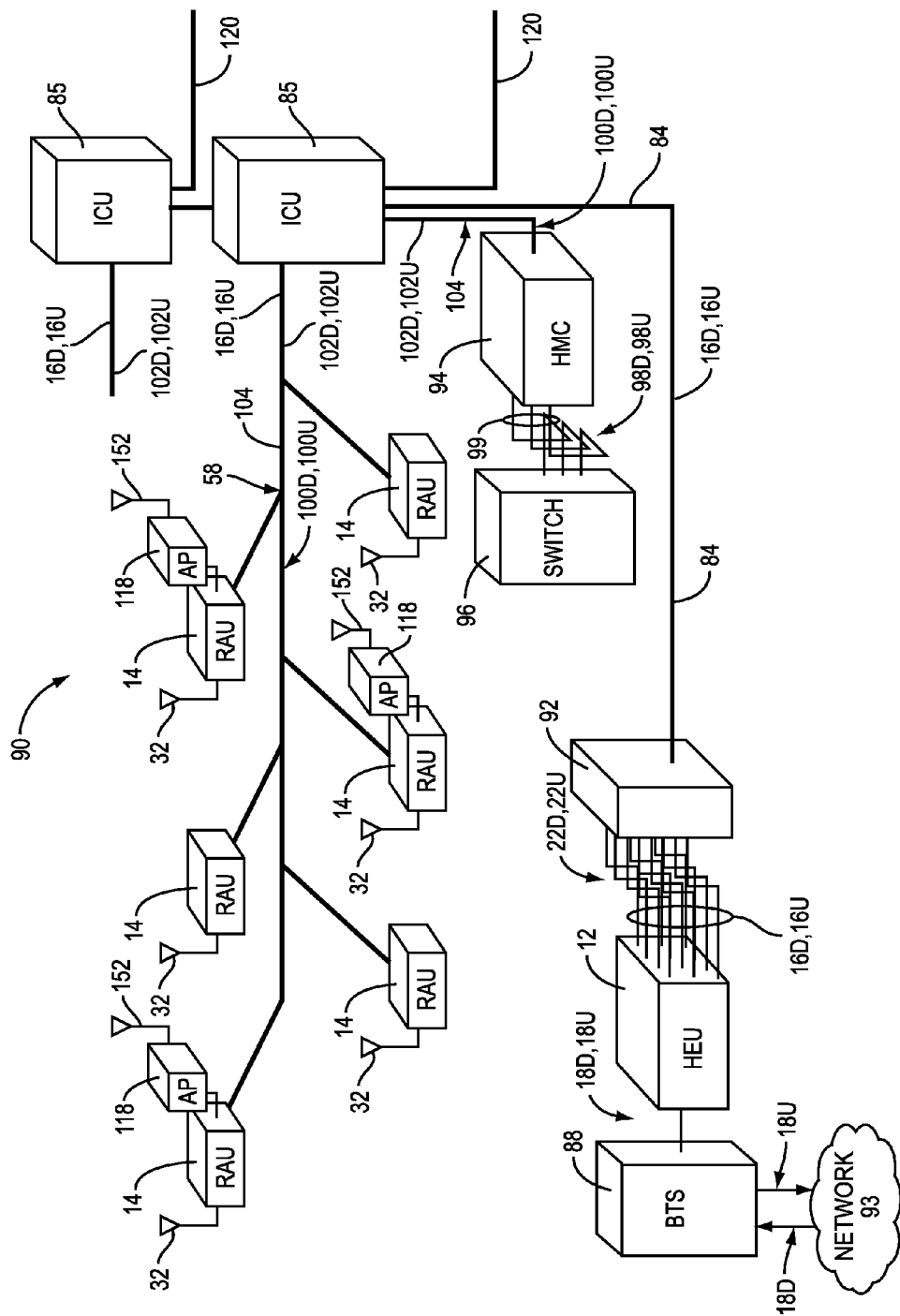
FIG. 4 is a schematic diagram of an exemplary embodiment of providing digital data services over downlink and uplink optical fibers separate from optical fibers providing radio frequency (RF) communication services to RAUs in an optical fiber-based distributed communications system.

FIG. 4 is a schematic diagram of an exemplary embodiment of providing digital data services over separate downlink and uplink optical fibers from radio frequency (RF) communication services to RAUs in an optical fiber-based distributed communications system 90. The optical fiber-based distributed communications system 90 includes some optical communication components provided in the optical fiber-based distributed communications system 10 of FIGS. 1-3. These common components are illustrated in FIG. 4 with common element numbers with FIGS. 1-3. As illustrated in FIG. 4, the HEU 12 is provided. The HEU 12 receives the downlink electrical RF signals 18D from the BTS 88. As previously discussed, the HEU 12 converts the downlink electrical RF signals 18D to downlink optical RF signals 22D to be distributed to the RAUs 14. The HEU 12 is also configured to convert the uplink optical RF signals 22U received from the RAUs 14 into uplink electrical RF signals 18U to be provided to the BTS 88 and on to a network 93 connected to the BTS 88. A patch panel 92 may be provided to receive the downlink and uplink optical fibers 16D, 16U configured to carry the downlink and uplink optical RF signals 22D, 22U. The downlink and uplink optical fibers 16D, 16U may be bundled together in one or more riser cables 84 and provided to one or more ICU 85, as previously discussed and illustrated in FIG. 3.

Figure 5:
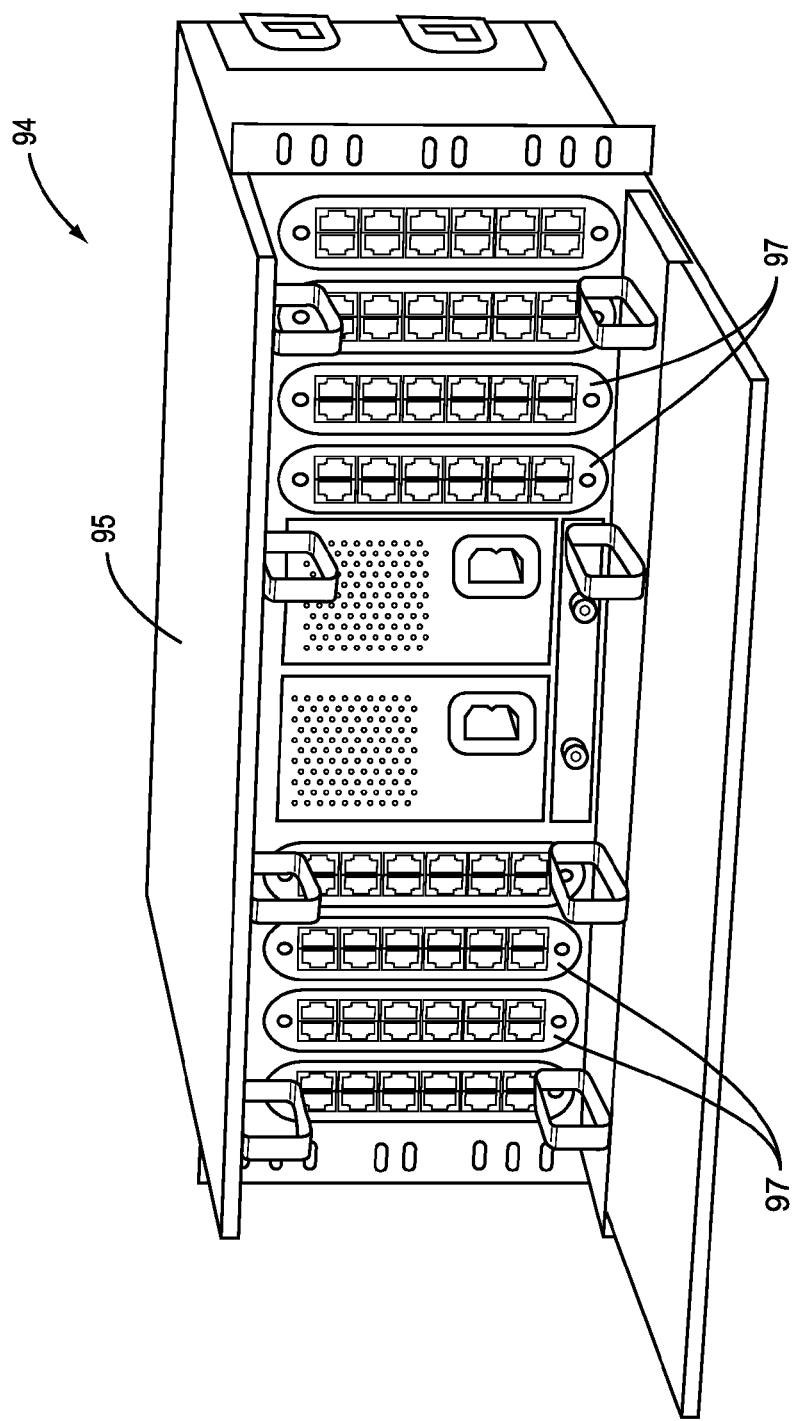
FIG. 5 is a diagram of an exemplary head-end media converter (HMC) employed in the optical fiber-based distributed communications system of FIG. 4 containing digital media converters (DMCs) configured to convert electrical digital signals to optical digital signals and vice versa.
Figure 6:
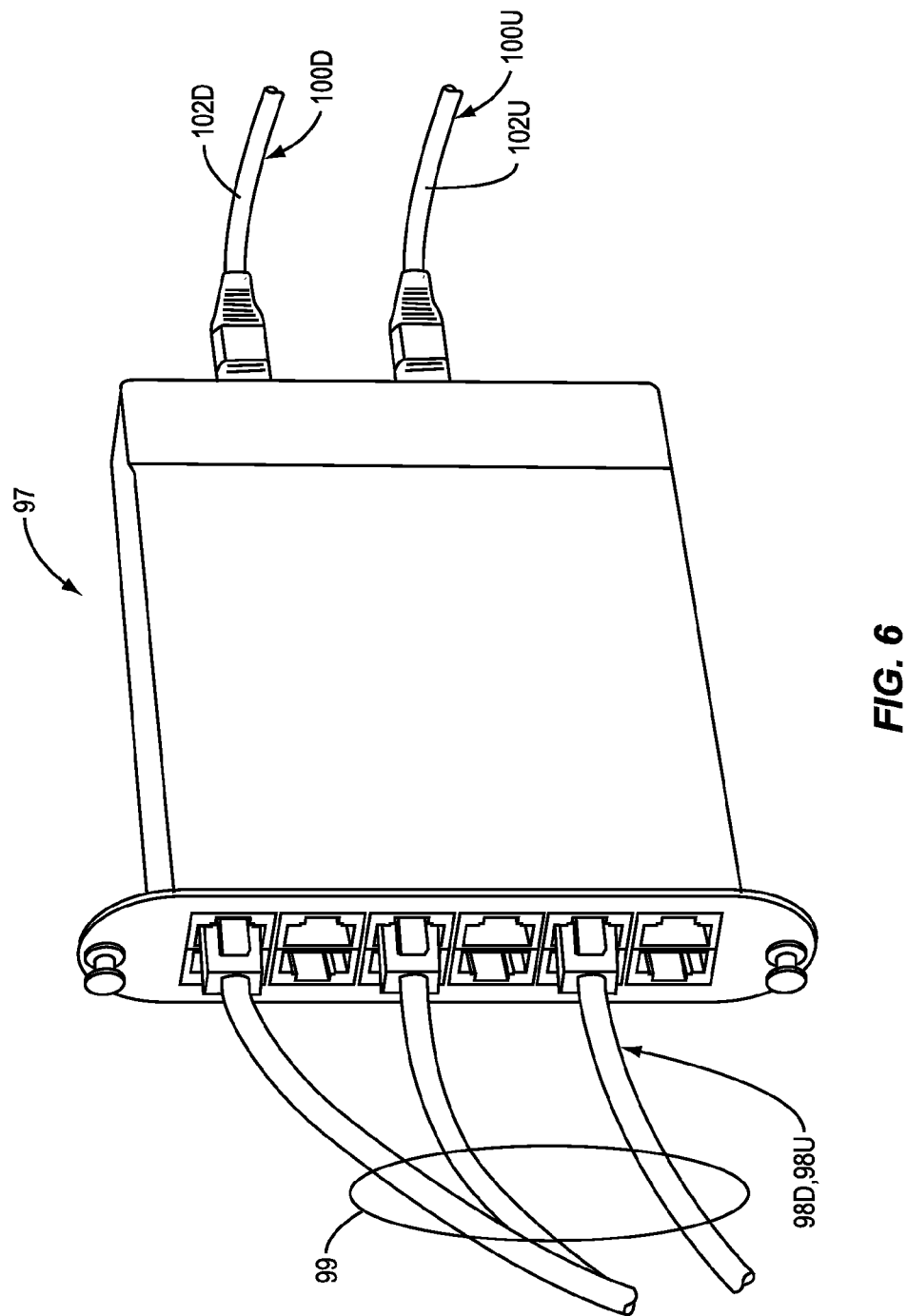
FIG. 6 is a diagram of exemplary DMCs employed in the HMC of FIG. 5.

To provide digital data services in the optical fiber-based distributed communications system 90 in this embodiment, a digital data service controller (also referred to as "DDS controller") in the form of a head-end media converter (HMC) 94 in this example is provided. The DDS controller 94 can include only a media converter for provision media conversion functionality or can include additional functionality to facilitate digital data services. A DDS controller is a controller configured to provide digital data services over a communications link, interface, or other communications channel or line, which may be either wired, wireless, or a combination of both. FIG. 5 illustrates an example of the HMC 94. The HMC 94 includes a housing 95 configured to house digital media converters (DMCs) 97 to interface to a digital data services switch 96 to support and provide digital data services. For example, the digital data services switch 96 could be an Ethernet switch. The digital data services switch 96 may be configured to provide Gigabit (Gb) Ethernet digital data service as an example. The DMCs 97 are configured to convert electrical digital signals to optical digital signals, and vice versa. The DMCs 97 may be configured for plug and play installation (i.e., installation and operability without user configuration required) into the HMC 94. FIG. 6 illustrates an exemplary DMC 97 that can be disposed in the housing 95 of the HMC 94. For example, the DMC 97 may include Ethernet input connectors or adapters (e.g., RJ-45) and optical fiber output connectors or adapters (e.g., LC, SC, ST, MTP).

Figure 7:
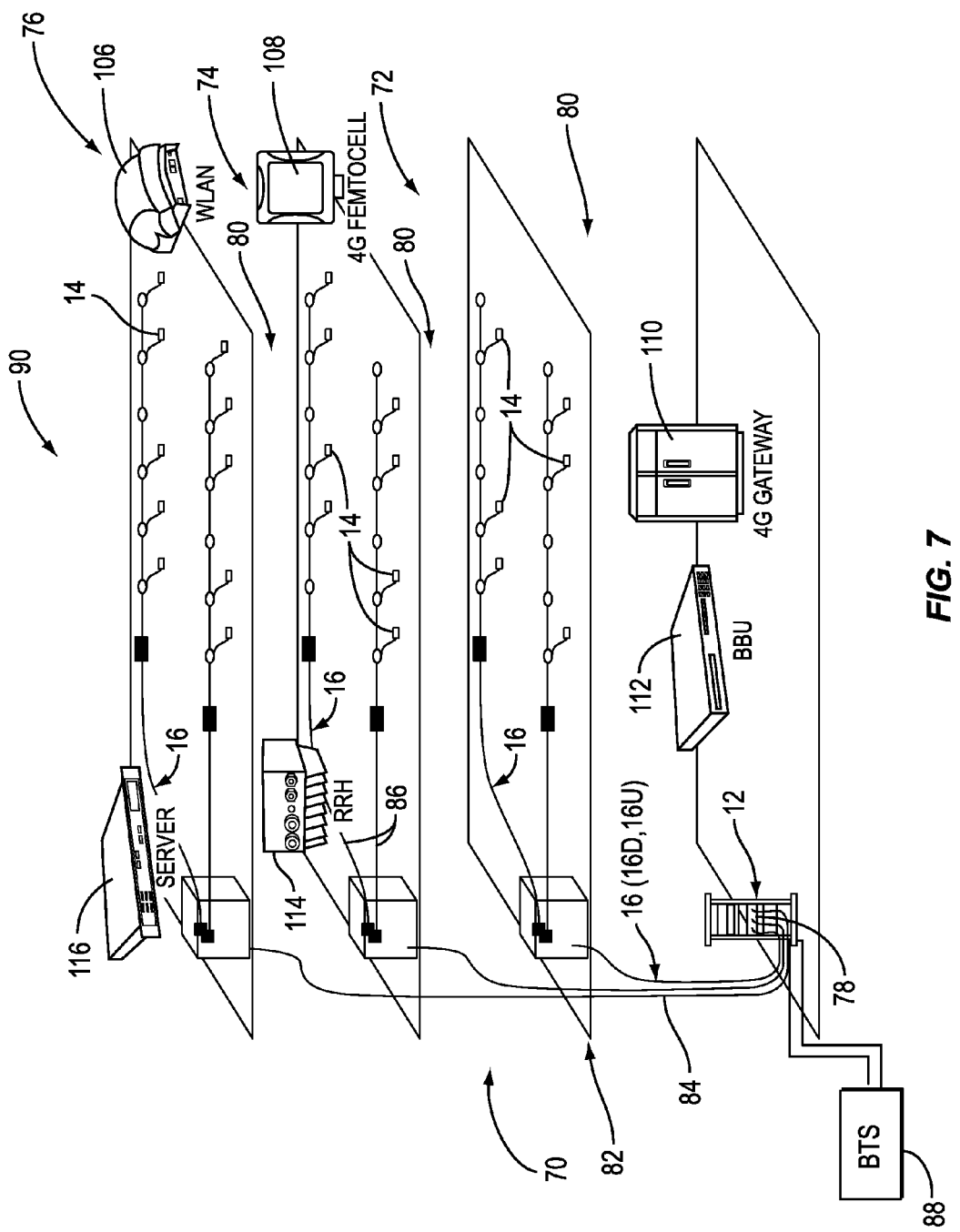
FIG. 7 is a schematic diagram of an exemplary building infrastructure in which digital data services and RF communication services are provided in an optical fiber-based distributed communications system.

With reference to FIG. 4, the HMC 94 (via the DMCs 97) in this embodiment is configured to convert downlink electrical digital signals (or downlink electrical digital data services signals) 98D over digital line cables 99 from the digital data services switch 96 into downlink optical digital signals (or downlink optical digital data services signals) 100D that can be communicated over downlink optical fiber 102D to RAUs 14. The HMC 94 (via the DMCs 97) is also configured to receive uplink optical digital signals 100U from the RAUs 14 via the uplink optical fiber 102U and convert the uplink optical digital signals 100U into uplink electrical digital signals 98U to be communicated to the digital data services switch 96. In this manner, the digital data services can be provided over optical fiber as part of the optical fiber-based distributed communications system 90 to provide digital data services in addition to RF communication services. Client devices located at the RAUs 94 can access these digital data services and/or RF communication services depending on their configuration. For example, FIG. 7 illustrates the building infrastructure 70 of FIG. 3, but with illustrative examples of digital data services and digital client devices that can be provided to client devices in addition to RF communication services in the optical fiber-based distributed communications system 90. As illustrated in FIG. 7, exemplary digital data services include WLAN 106, femtocells 108, gateways 110, baseband units (BBU) 112, remote radio heads (RRH) 114, and servers 116.

With reference back to FIG. 4, in this embodiment, the downlink and uplink optical fibers 102D, 102U are provided in a fiber optic cable 104 that is interfaced to the ICU 85. The ICU 85 provides a common point in which the downlink and uplink optical fibers 102D, 102U carrying digital optical signals can be bundled with the downlink and uplink optical fibers 16U, 16D carrying RF optical signals. One or more of the fiber optic cables 104, also referenced herein as array cables 104, can be provided containing the downlink and uplink optical fibers 16D, 16U for RF communication services and downlink and uplink optical fibers 102D, 102U for digital data services to be routed and provided to the RAUs 14. Any combination of services or types of optical fibers can be provided in the array cable 104. For example, the array cable 104 may include single mode and/or multi-mode optical fibers for RF communication services and/or digital data services.

Examples of ICUs that may be provided in the optical fiber-based distributed communications system 90 to distribute both downlink and uplink optical fibers 16D, 16U for RF communication services and downlink and uplink optical fibers 102D, 102U for digital data services are described in U.S. patent application Ser. No. 12/466,514 filed on May 15, 2009 and entitled "Power Distribution Devices, Systems, and Methods For Radio-Over-Fiber (RoF) Distributed Communication," incorporated herein by reference in its entirety, and U.S. Provisional Patent Application Ser. No. 61/330,385, filed on May 2, 2010 and entitled "Power Distribution in Optical Fiber-based Distributed Communication Systems Providing Digital Data and Radio-Frequency (RF) Communication Services, and Related Components and Methods," both of which are incorporated herein by reference in their entireties.

With continuing reference to FIG. 4, some RAUs 14 can be connected to access points (APs) 118 or other devices supporting digital data services. APs 118 are illustrated, but the APs 118 could be any other device supporting digital data services. In the example of APs, the APs 118 provide access to the digital data services provided by the digital data services switch 96. This is because the downlink and uplink optical fibers 102D, 102U carrying downlink and uplink optical digital signals 100D, 100U converted from downlink and uplink electrical digital signals 98D, 98U from the digital data services switch 96 are provided to the APs 118 via the array cables 104 and RAUs 14. Digital data client devices can access the APs 118 to access digital data services provided through the digital data services switch 96.

Digital data service clients, such as APs, require power to operate and to receive digital data services. By providing digital data services as part of an optical fiber-based distributed communications system, power distributed to the RAUs in the optical fiber-based distributed communications system can also be used to provide access to power for digital data service clients. This may be a convenient method of providing power to digital data service clients as opposed to providing separate power sources for digital data service clients. For example, power distributed to the RAUs 14 in FIG. 4 by or through the ICU 85 can also be used to provide power to the APs 118 located at RAUs 14 in the optical fiber-based distributed communications system 90. In this regard, the ICUs 85 may be configured to provide power for both RAUs 14 and the APs 118. A power supply may be located within the ICU 85, but could also be located outside of the ICU 85 and provided over an electrical power line 120, as illustrated in FIG. 4. The ICU 85 may receive either alternating current (AC) or direct current (DC) power. The ICU 85 may receive 110 Volts (V) to 240V AC or DC power. The ICU 85 can be configured to produce any voltage and power level desired. The power level is based on the number of RAUs 14 and the expected loads to be supported by the RAUs 14 and any digital devices connected to the RAUs 14 in FIG. 4. It may further be desired to provide additional power management features in the ICU 85. For example, one or more voltage protection circuits may be provided.

Figure 8:
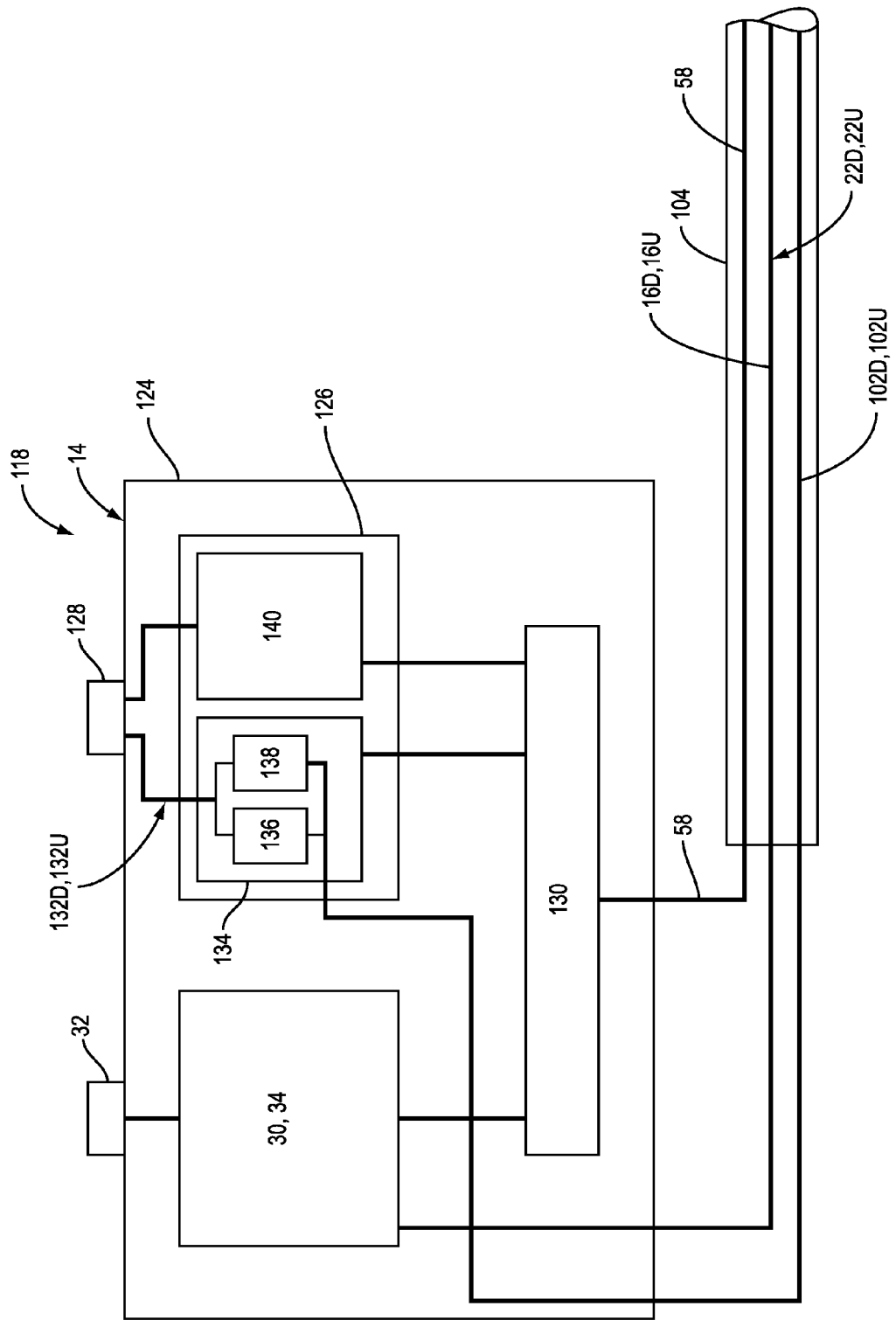
FIG. 8 is a schematic diagram of an exemplary RAU that can be employed in an optical fiber-based distributed communications system providing exemplary digital data services and RF communication services.

FIG. 8 is a schematic diagram of exemplary internal components in the RAU 14 of FIG. 4 to further illustrate how the downlink and uplink optical fibers 16D, 16D for RF communications, the downlink and uplink optical fibers 102D, 102U for digital data services, and electrical power are provided to the RAU 14 and can be distributed therein. As illustrated in FIG. 8, the array cable 104 is illustrated that contains the downlink and uplink optical fibers 16D, 16D for RF communications, the downlink and uplink optical fibers 102D, 102U for digital data services, and the electrical power line 58 (see also, FIG. 2) carrying power from the ICU 85. As previously discussed in regard to FIG. 2, the electrical power line 58 may comprise two wires 60, 62, which may be copper lines for example.

The downlink and uplink optical fibers 16D, 16U for RF communications, the downlink and uplink optical fibers 102D, 102U for digital data services, and the electrical power line 58 come into a housing 124 of the RAU 14. The downlink and uplink optical fibers 16D, 16U for RF communications are routed to the O-E converter 30 and E-O converter 34, respectively, and to the antenna 32, as also illustrated in FIG. 2 and previously discussed. The downlink and uplink optical fibers 102D, 102U for digital data services are routed to a digital data services interface 126 provided as part of the RAU 14 to provide access to digital data services via a port 128, which will be described in more detail below. The electrical power line 58 carries power that is configured to provide power to the O-E converter 30 and E-O converter 34 and to the digital data services interface 126. In this regard, the electrical power line 58 is coupled to a voltage controller 130 that regulates and provides the correct voltage to the O-E converter 30 and E-O converter 34 and to the digital data services interface 126 and other circuitry in the RAU 14.

In this embodiment, the digital data services interface 126 is configured to convert downlink optical digital signals 100D on the downlink optical fiber 102D into downlink electrical digital signals 132D that can be accessed via the port 128. The digital data services interface 126 is also configured to convert uplink electrical digital signals 132U received through the port 128 into uplink optical digital signals 100U to be provided back to the HMC 94 (see FIG. 4). In this regard, a media converter 134 is provided in the digital data services interface 126 to provide these conversions. The media converter 134 contains an O-E digital converter 136 to convert downlink optical digital signals 100D on the downlink optical fiber 102D into downlink electrical digital signals 132D. The media converter 134 also contains an E-O digital converter 138 to convert uplink electrical digital signals 132U received through the port 128 into uplink optical digital signals 100U to be provided back to the HMC 94. In this regard, power from the electrical power line 58 is provided to the digital data services interface 126 to provide power to the O-E digital converter 136 and E-O digital converter 138.

Because electrical power is provided to the RAU 14 and the digital data services interface 126, this also provides an opportunity to provide power for digital devices connected to the RAU 14 via the port 128. In this regard, a power interface 140 is also provided in the digital data services interface 126, as illustrated in FIG. 8. The power interface 140 is configured to receive power from the electrical power line 58 via the voltage controller 130 and to also make power accessible through the port 128. In this manner, if a client device contains a compatible connector to connect to the port 128, not only will digital data services be accessible, but power from the electrical power line 58 can also be accessed through the same port 128. Alternatively, the power interface 140 could be coupled to a separate port from the port 128 for digital data services.

For example, if the digital data services are provided over Ethernet, the power interface 140 could be provided as a Power-over-Ethernet (PoE) interface. The port 128 could be configured to receive a RJ-45 Ethernet connector compatible with PoE as an example. In this manner, an Ethernet connector connected into the port 128 would be able to access both Ethernet digital data services to and from the downlink and uplink optical fibers 102D, 102U to the HMC 94 as well as access power distributed by the ICU 85 over the array cable 104 provided by the electrical power line 58.

Further, the HEU 12 could include low level control and management of the media converter 134 using communication supported by the HEU 12. For example, the media converter 134 could report functionality data (e.g., power on, reception of optical digital data, etc.) to the HEU 12 over the uplink optical fiber 16U that carries communication services. The RAU 14 can include a microprocessor that communicates with the media converter 134 to receive this data and communicate this data over the uplink optical fiber 16U to the HEU 12.

Figure 9:
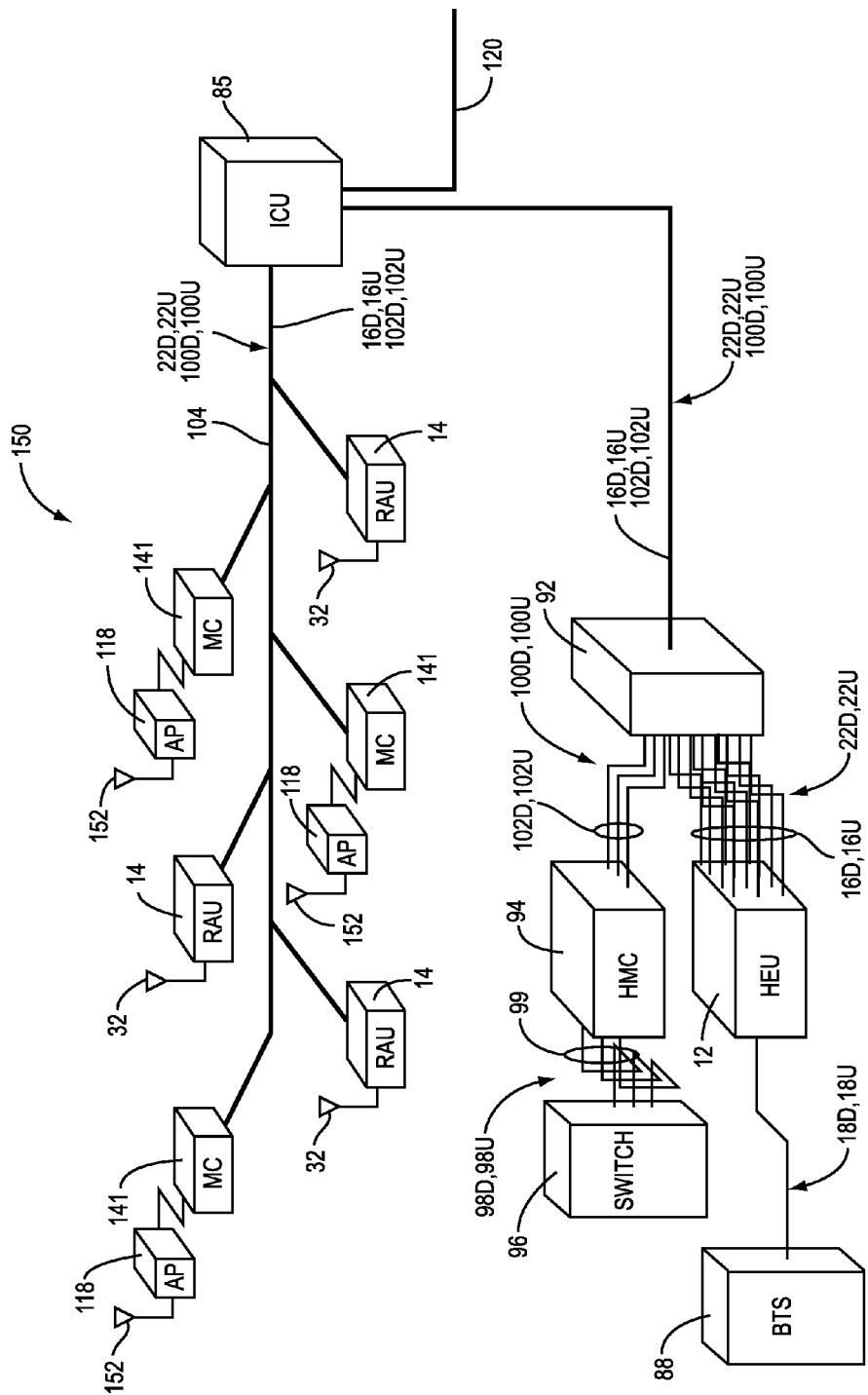
FIG. 9 is a schematic diagram of another exemplary embodiment of providing digital data services over separate downlink and uplink optical fibers from RF communication services to RAUs in an optical fiber-based distributed communications system.

Other configurations are possible to provide digital data services in an optical fiber-based distributed communications system. For example, FIG. 9 is a schematic diagram of another exemplary embodiment of providing digital data services in an optical fiber-based distributed communications system configured to provide RF communication services. In this regard, FIG. 9 provides an optical fiber-based distributed communications system 150. The optical fiber-based distributed communications system 150 may be similar to and include common components provided in the optical fiber-based distributed communications system 90 in FIG. 4. In this embodiment, instead of the HMC 94 being provided separate from the HEU 12, the HMC 94 is co-located with the HEU 12. The downlink and uplink optical fibers 102D, 102U for providing digital data services from the digital data services switch 96 are also connected to the patch panel 92. The downlink and uplink optical fibers 16D, 16U for RF communications and the downlink and uplink optical fibers 102D, 102U for digital data services are then routed to the ICU 85, similar to FIG. 2.

The downlink and uplink optical fibers 16D, 16U for RF communications, and the downlink and uplink optical fibers 102D, 102U for digital data services, may be provided in a common fiber optic cable or provided in separate fiber optic cables. Further, as illustrated in FIG. 9, standalone media converters (MCs) 141 may be provided separately from the RAUs 14 in lieu of being integrated with RAUs 14, as illustrated in FIG. 4. The stand alone MCs 141 can be configured to contain the same components as provided in the digital data services interface 126 in FIG. 8, including the media converter 134. The APs 118 may also each include antennas 152 to provide wireless digital data services in lieu of or in addition to wired services through the port 128 through the RAUs 14.

Figure 10A:
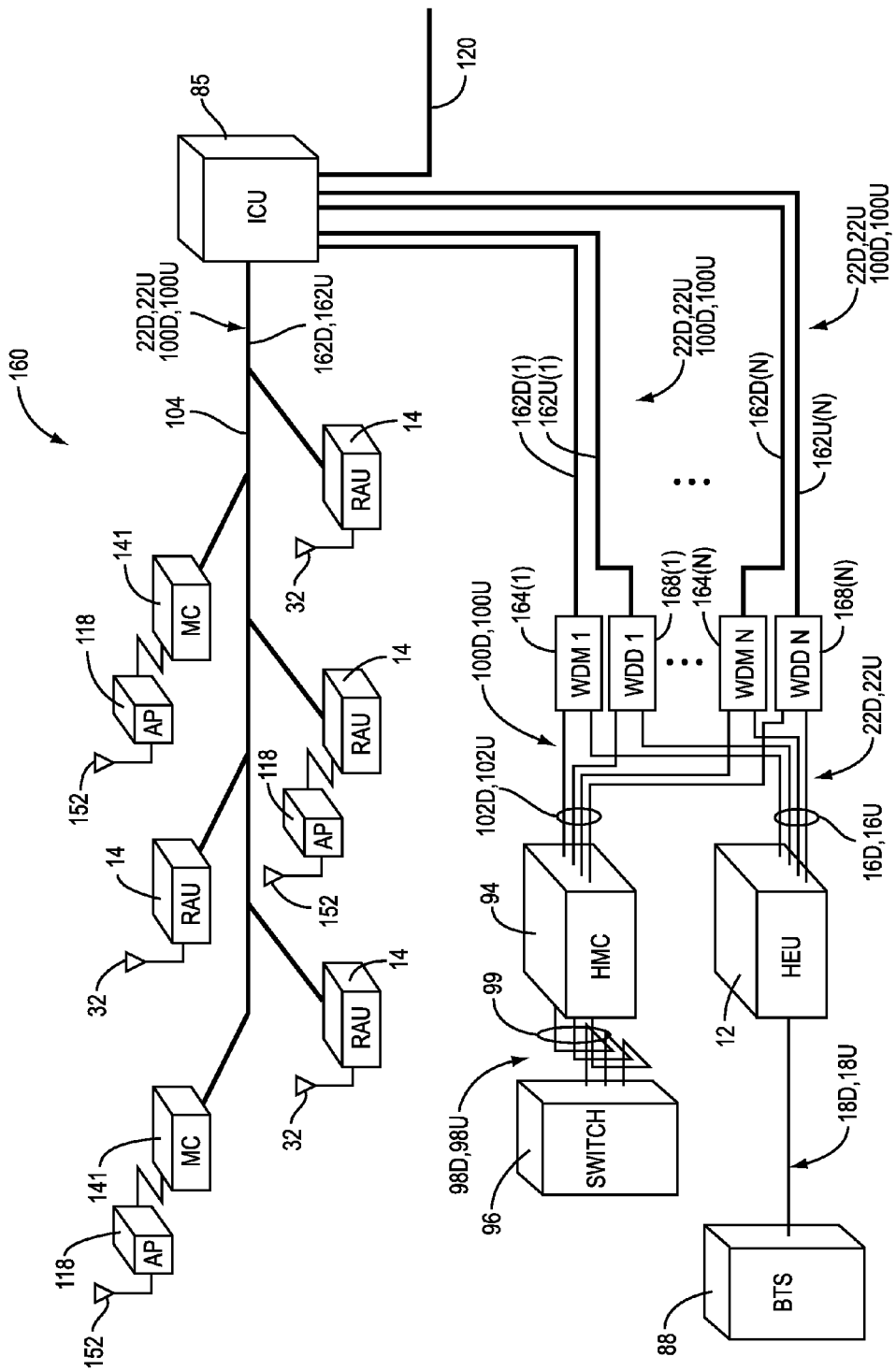
FIG. 10A is a schematic diagram of an exemplary embodiment of employing wavelength-division multiplexing (WDM) to multiplex digital data services and RF communication services at different wavelengths over downlink and uplink optical fibers in an optical fiber-based distributed communications system.

FIG. 10A is a schematic diagram of another exemplary embodiment of providing digital data services in an optical fiber-based distributed communications system. In this regard, FIG. 10A provides an optical fiber-based distributed communications system 160. The optical fiber-based distributed communications system 160 may be similar to and include common components provided in the optical fiber-based distributed communications systems 90, 150 in FIGS. 4 and 9.

In this embodiment, as illustrated in FIG. 10A, wavelength-division multiplexing (WDM) is employed to multiplex digital data services and RF communication services together at different wavelengths over downlink and uplink optical fibers 162D(1-N), 162U(1-N) in the optical fiber-based distributed communications system 160. "1-N" downlink and uplink optical fiber pairs are provided to the ICU 85 to be distributed to the RAUs 14 and stand alone MCs 141. Multiplexing could be used to further reduce the cost for the digital data services overlay. By using WDM, digital data signals are transmitted on the same optical fibers as the RF communication signals, but on different wavelengths. Separate media conversion and WDM filters at the transmit locations and at the receive locations (e.g., HMC 96 and RAUs 14) would be employed to receive signals at the desired wavelength.

The HMC 94 and HEU 12 are co-located in the optical fiber-based distributed communications system 160 in FIG. 10A. A plurality of wavelength-division multiplexers 164(1)-164(N) are provided that each multiplex the downlink optical RF signal(s) 22D for RF communications and the downlink optical digital signal(s) 100D for digital data services together on a common downlink optical fiber(s) 162D(1-N). Similarly, a plurality of wavelength-division de-multiplexers 168(1)-168(N) (e.g., wavelength filters) are provided that each de-multiplex the uplink optical RF signal(s) 22U from the uplink optical digital signal(s) 100U from a common uplink optical fiber(s) 162U(1-N) to provide the uplink optical RF signals 22U to the HEU 12 and the uplink optical digital signal 100U to the HMC 94. Wavelength-division de-multiplexing (WDD) and WDM are also employed in the RAUs 14 to de-multiplex multiplexed downlink optical RF signals 22D and downlink optical digital signals 100D on the common downlink optical fibers 162D(1-N) and to multiplex uplink optical RF signals 22U and uplink optical digital signals 100U on the common uplink optical fibers 162U(1-N).

Figure 10B:
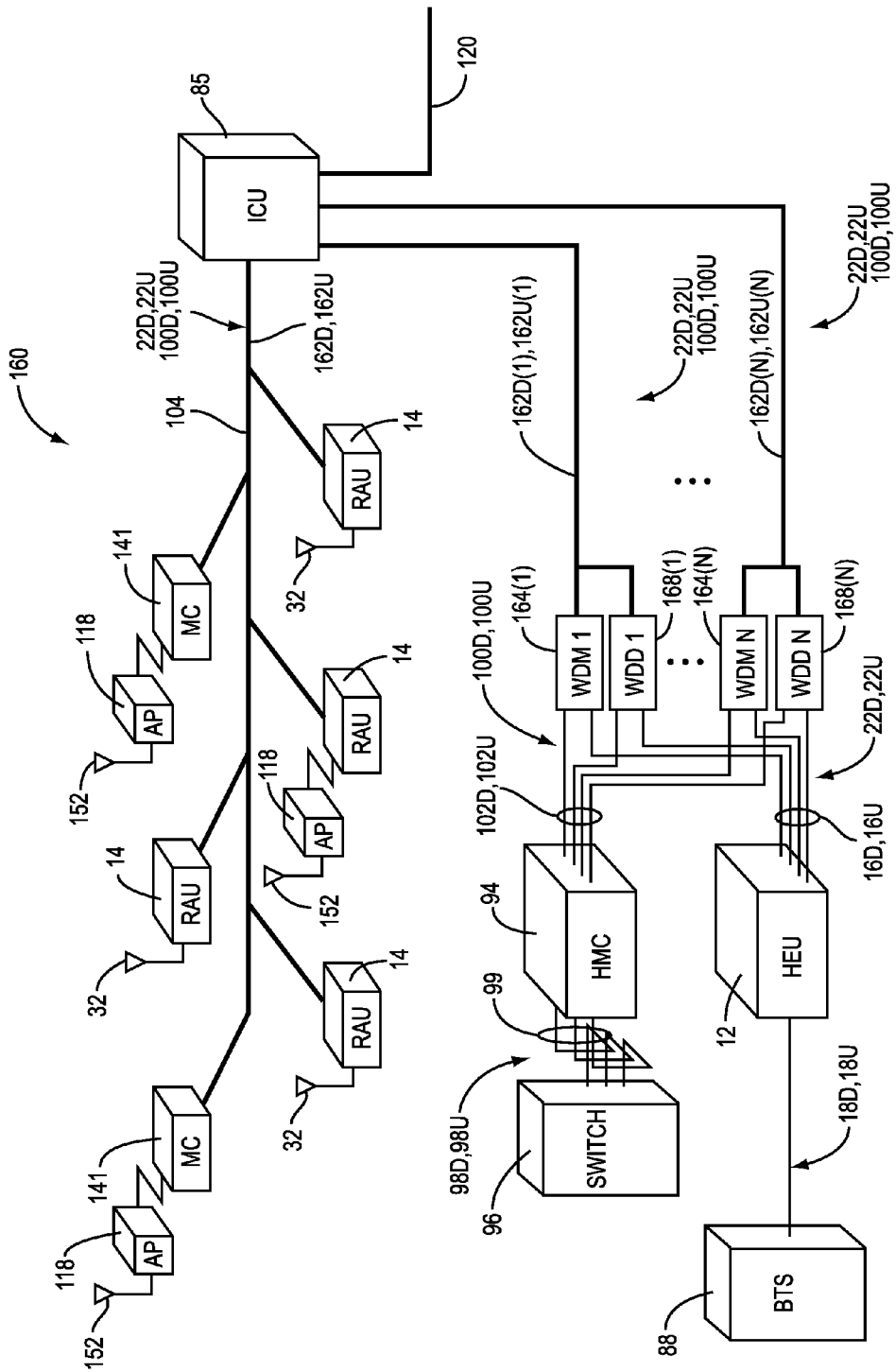
FIG. 10B is a schematic diagram of an exemplary embodiment of employing WDM to multiplex uplink and downlink communications for each channel over a common optical fiber.
Figure 11:
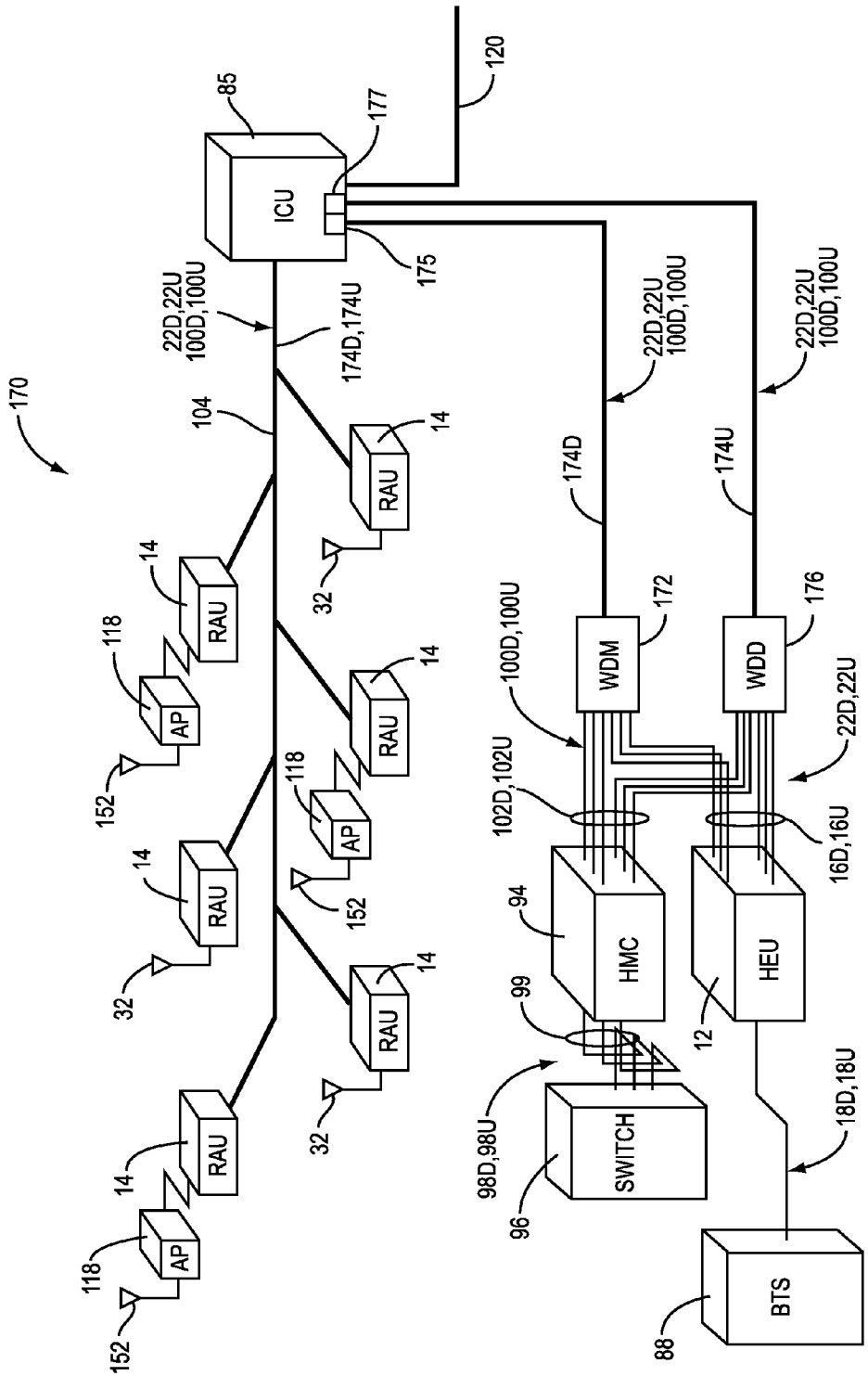
FIG. 11 is a schematic diagram of another exemplary embodiment of employing WDM in a co-located HEU and HMC to multiplex digital data services and RF communication services at different wavelengths over common downlink optical fibers and common uplink optical fibers in an optical fiber-based distributed communications system.

FIG. 10B is a schematic diagram of another exemplary embodiment of providing digital data services in an optical fiber-based distributed communications system 160'. The optical fiber-based distributed communications system 160' in FIG. 10B is the same as the optical fiber-based distributed communications system 160 in FIG. 10A, except that WDM is employed to multiplex uplink and downlink communication services at different wavelengths over common optical fiber that includes both downlink and uplink optical fibers 162D(1-N), 162U(1-N), FIG. 11 is a schematic diagram of another exemplary embodiment of providing digital data services in an optical fiber-based distributed communications system. As illustrated in FIG. 11, an optical fiber-based distributed communications system 170 is provided that can also deliver digital data services. Instead of wavelength-division multiplexing the downlink optical RF signal(s) 22D for RF communications with the downlink optical digital signal(s) 100D for digital data services together on a common downlink optical fiber(s) 162D(1-N) as provided in FIG. 10A, a wavelength-division multiplexer 172 is provided. The wavelength-division multiplexer 172 multiplexes all downlink optical RF signals 22D with all downlink optical digital signal 100D to a single downlink optical fiber 174D. Similarly, a wavelength-division de-multiplexer 176 is provided to de-multiplex all uplink optical RF signals 22U from all uplink optical digital signals 100U from the common uplink optical fiber 174U at the desired wavelength. A wavelength-division de-multiplexer 175 and a wavelength-division multiplexer 177 are also employed in the ICU 85 to de-multiplex wavelength-division multiplexed downlink optical RF signals 22D and uplink optical digital signals 100U on the common downlink optical fiber 174D, and to wavelength-division multiplex uplink optical RF signals 22U and uplink optical digital signals 100U on the common uplink optical fiber 174U, respectively.

Alternatively, WDD and WDM could also be employed in the RAUs 14 to de-multiplex wavelength-division multiplexed downlink optical RF signals 22D and downlink optical digital signals 100D on the common downlink optical fiber 174D, and to wavelength-division multiplex uplink optical RF signals 22U and uplink optical digital signals 100U on the common uplink optical fiber 174U. In this alternative embodiment, de-multiplexing at the RAUs 14 could be done where a common WDM signal would be distributed from RAU 14 to RAU 14 in a daisy-chain configuration. Alternatively, optical splitters could be employed at break-out points in the fiber optic cable 104.

Figure 12:
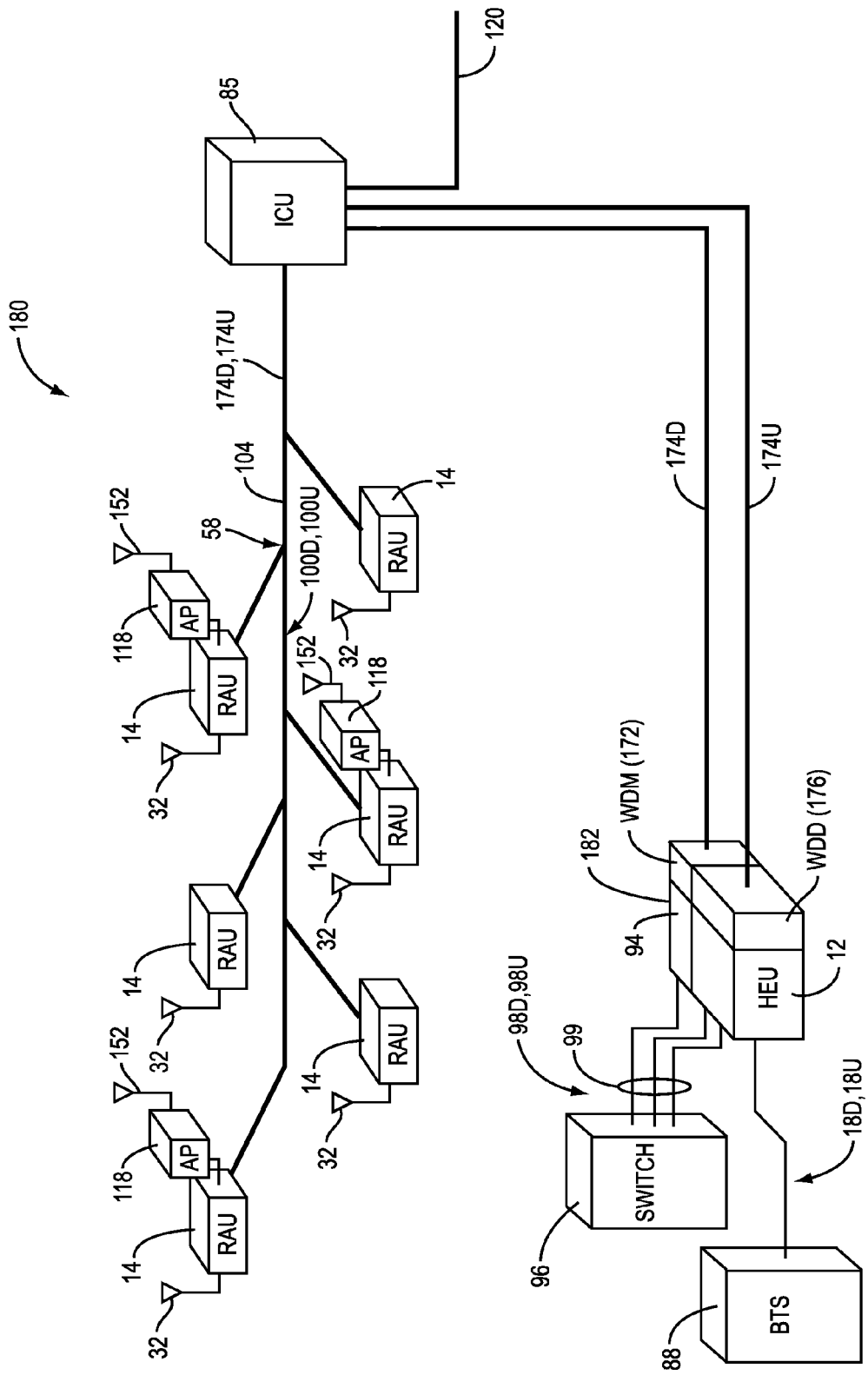
FIG. 12 is a schematic diagram of another exemplary embodiment of employing WDM in a common housing HEU and MC to multiplex digital data services and RF communication services at different wavelengths over a common downlink optical fiber and a common uplink optical fiber in an optical fiber-based distributed communications system.

FIG. 12 is a schematic diagram of another exemplary embodiment of providing digital data services in an optical fiber-based distributed communications system. As illustrated in FIG. 12, an optical fiber-based distributed communications system 180 is provided that can also deliver digital data services. The optical fiber-based distributed communications system 180 is the same as the optical fiber-based distributed communications system 170 in FIG. 11, except that the HEU 12 and HMC 94 are provided in a common housing 182 that also houses the wavelength-division multiplexer 172 and wavelength-division de-multiplexer 176. Alternatively, a plurality of wavelength-division multiplexers and plurality of wavelength-division de-multiplexers like provided in FIG. 10A (164(1-N)) and 168(1-N)) can be provided in the common housing 182.

Figure 13:
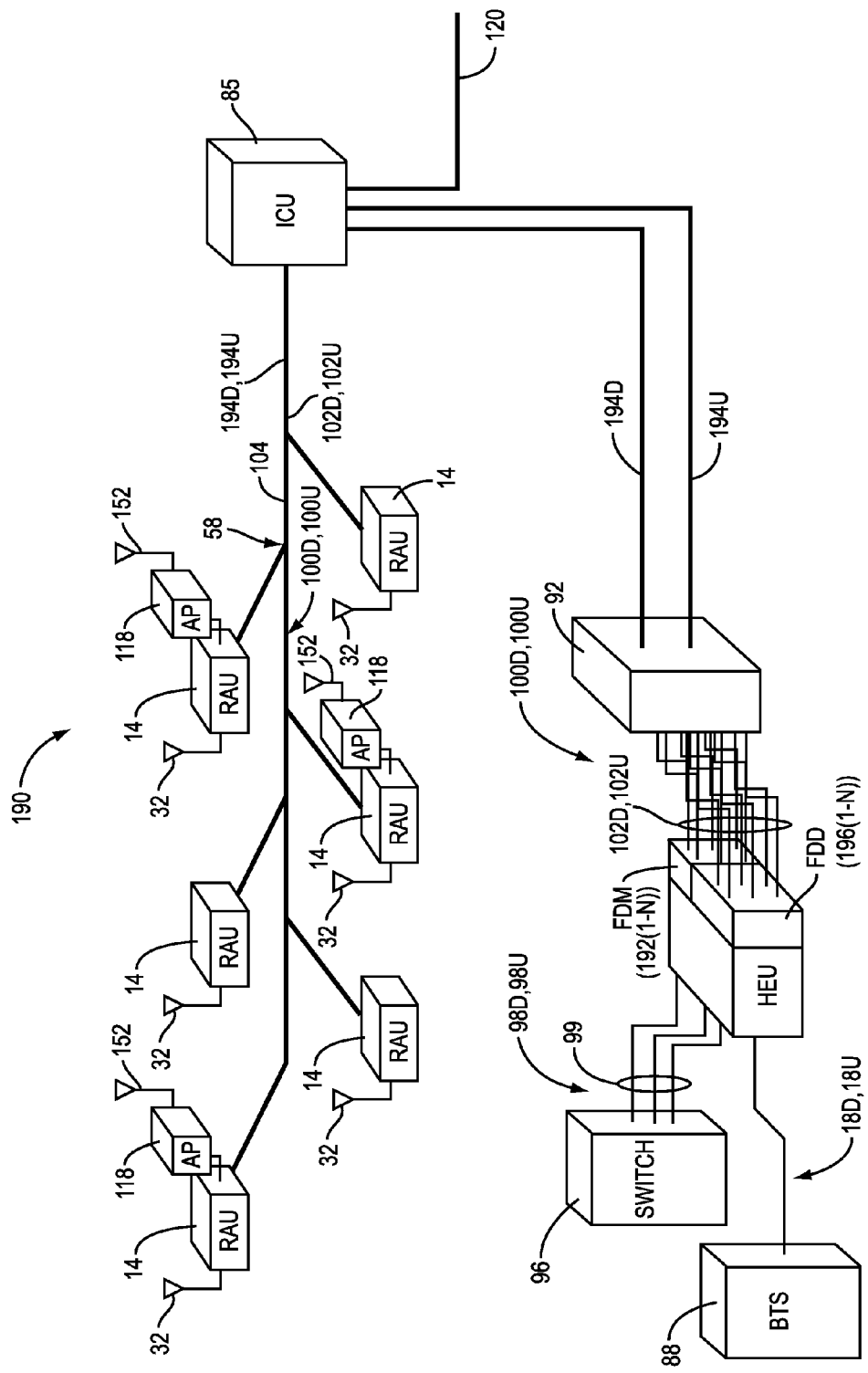
FIG. 13 is a schematic diagram of another exemplary embodiment of employing frequency-division multiplexing (FDM) to multiplex digital data services and RF communication services at different frequencies over downlink optical fibers and uplink optical fibers in an optical fiber-based distributed communications system.

FIG. 13 is a schematic diagram of another exemplary embodiment of an optical fiber-based distributed communications system providing digital data services. As illustrated in FIG. 13, an optical fiber-based distributed communications system 190 is provided. In this embodiment, frequency-division multiplexing (FDM) is employed to multiplex digital data services and RF communication services at different frequencies over downlink optical fibers and uplink optical fibers. One advantage of employing FDM is that E-O converters would be used simultaneously for converting RF communication signals and digital data signals into respective optical signals. Therefore, additional media converters for converting electrical digital signals to optical digital signals can be avoided to reduce complexity and save costs. For example, fast Ethernet (e.g., 100 Megabits/second (Mbs)) could be transmitted below the cellular spectrum (e.g., below 700 MHz). More than one (1) channel could be transmitted simultaneously in this frequency range.

In this regard, the HEU 12 and HEC 94 are both disposed in the common housing 182, as illustrated in FIG. 13. A plurality of frequency-division multiplexers 192(1-N) are provided in the common housing 182 and are each configured to multiplex the downlink electrical digital signal(s) 98D with the downlink electrical RF signal(s) 18D at different frequencies prior to optical conversion. In this manner, after optical conversion, a common optical fiber downlink 194D(1-N) can carry frequency-division multiplexed downlink optical RF signal 22D and downlink optical digital signal 102D on the same downlink optical fiber 194D(1-N). Similarly, a plurality of frequency-division de-multiplexers 196(1-N) are provided in the common housing 182 to de-multiplex an uplink optical RF signal 22U and an uplink optical digital signal 100U on an uplink optical fiber 194U(1-N). Frequency-division de-multiplexing (FDD) and FDM are also employed in the RAUs 14. FDD is employed in the RAU 14 to de-multiplex frequency multiplexed downlink electrical RF signals 18D and downlink electrical digital signals 98D after being converted from optical signals from the common downlink optical fiber 174D to electrical signals. FDM is also provided in the RAU 14 to frequency multiplex uplink electrical signals in the RAU 14 before being converted to uplink optical RF signals 22U and uplink optical digital signals 100U provided on the common uplink optical fiber 174U.

Figure 14:
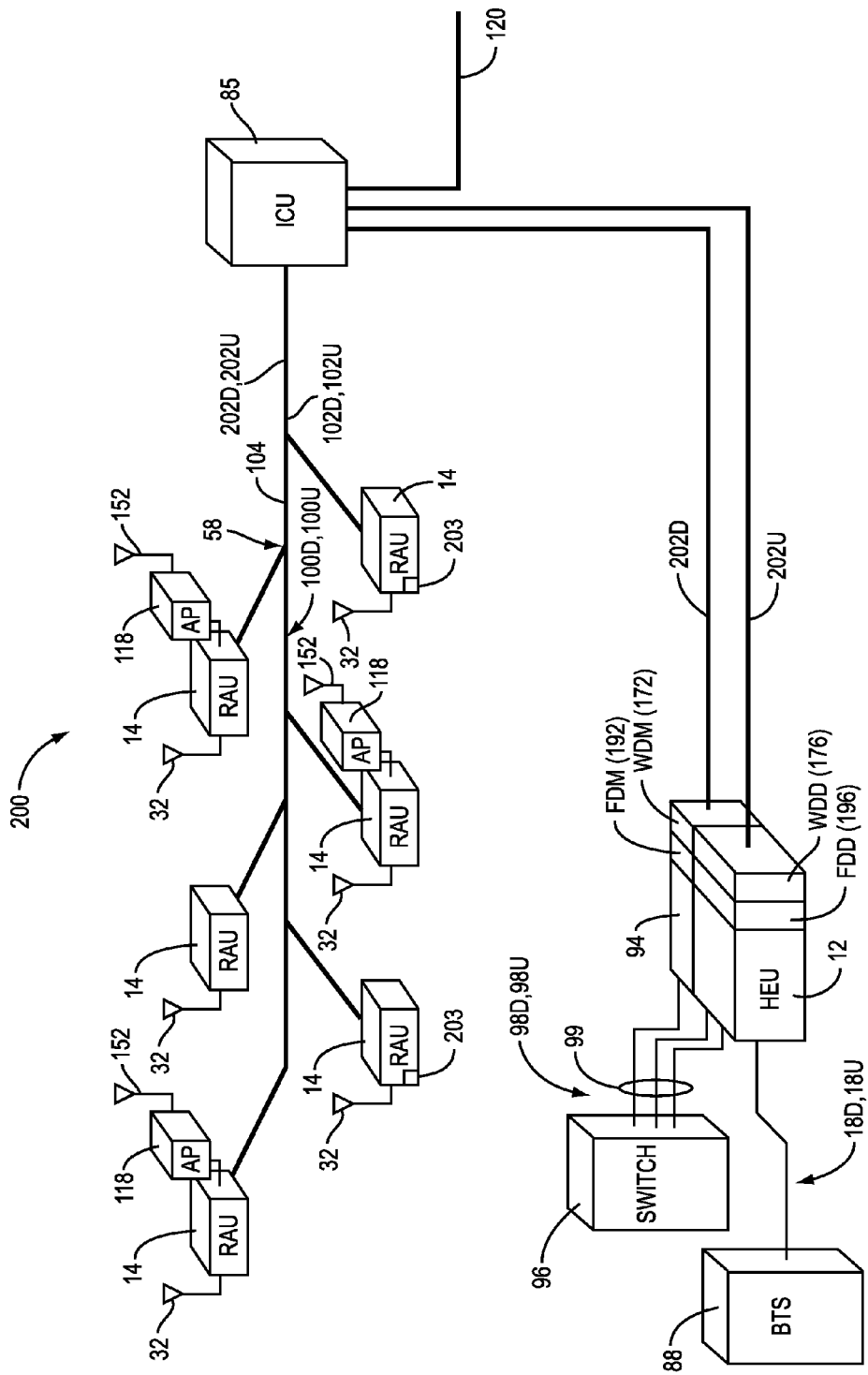
FIG. 14 is a schematic diagram of another exemplary embodiment of employing FDM and WDM to multiplex digital data services and RF communication services at different frequencies and at different wavelengths over downlink optical fibers and uplink optical fibers in an optical fiber-based distributed communications system.

FIG. 14 is a schematic diagram of another exemplary embodiment of an optical fiber-based distributed communications system that employs both WDM and FDM. In this regard, FIG. 14 illustrates an optical fiber-based distributed communications system 200. The optical fiber-based distributed communications system 200 employs the WDM and WDD of the optical fiber-based distributed communications system 180 of FIG. 12 combined with FDM and FDD of the optical fiber-based distributed communications system 190 of FIG. 13. The wavelength-division multiplexed and frequency-division multiplexed downlink signals are provided over downlink optical fiber 202D. The wavelength-division multiplexed and frequency-division multiplexed uplink signals are provided over uplink optical fiber 202U.

Options and alternatives can be provided for the above-described embodiments. A digital data services interface provided in an RAU or stand alone MC could include more than one digital data services port. For example, referring to FIG. 14 as an example, a switch 203, such as an Ethernet switch for example, may be disposed in the RAUs 14 to provide RAUs 14 that can support more than one digital data services port. An HMC could have an integrated Ethernet switch so that, for example, several APs could be attached via cables (e.g., Cat 5/6/7 cables) in a star architecture. The Ethernet channel could be used for control, management, and/or communication purposes for an optical fiber-based distributed communications system as well as the Ethernet media conversion layer. The HMC could be either single channel or multi-channel (e.g., twelve (12) channel) solutions. The multi-channel solution may be cheaper per channel than a single channel solution. Further, uplink and downlink electrical digital signals can be provided over mediums other than optical fiber, including electrical conducting wire and/or wireless communications, as examples.

Frequency up conversions or down conversions may be employed when providing FDM if RF communication signals have frequencies too close to the frequencies of the digital data signals to avoid interference. While digital baseband transmission of a baseband digital data signals below the spectrum of the RF communication signals can be considered, intermodulation distortion on the RF communication signals may be generated. Another approach is to up convert the digital data signals above the frequencies of the RF communication signals and also use, for example, a constant envelope modulation format for digital data signal modulation. Frequency Shift Keying (FSK) and Minimum Shift Keying (MSK) modulation are suitable examples for such modulation formats. Further, in the case of FDM for digital data services, higher-level modulation formats can be considered to transmit high data rates (e.g., one (1) Gb, or ten (10) Gb) over the same optical fiber as the RF communication signals. Multiple solutions using single-carrier (with e.g., 8-FSK or 16-QAM as examples) or multi-carrier (OFDM) are conceivable.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of imitation.

We claim:

1. A distributed antenna system for distributing radio frequency (RF) communications and digital data services (DDS) to at least one remote antenna unit (RAU), comprising:
    a head-end unit (HEU) configured to:
        receive at least one downlink electrical RF communications signal;
        convert the at least one downlink electrical RF communications signal into at least one downlink optical RF communications signal to be communicated over at least one communications downlink to the at least one RAU;
        receive at least one uplink optical RF communications signal over at least one communications uplink from the at least one RAU; and
        convert the at least one uplink optical RF communications signal into at least one uplink electrical RF communications signal;
    a DDS controller configured to:
        receive at least one downlink signal containing at least one DDS;
        provide at least one downlink optical digital signal containing at least one DDS over at least one second communications downlink to the at least one RAU;
        receive at least one uplink optical digital signal over at least one second communications uplink from the at least one RAU;
        convert the at least one uplink optical digital signal to at least one uplink electrical digital signal;
        receive at least one second uplink optical digital signal over the at least one second communications uplink from the at least one media controller (MC); and
        convert the at least one second uplink optical digital signal to at least one second uplink electrical digital signal; and
    an interconnect unit (ICU) located separately from, and in between, the DDS controller and the at least one RAU, the ICU configured to:
        receive the at least one downlink optical RF communications signal from the HEU; and
        receive the at least one downlink optical digital signal from the DDS controller.

2. The distributed antenna system of claim 1, wherein the distributed antenna system is deployed over multiple floors of a building infrastructure, the at least one RAU comprising a plurality of RAUs, a plurality of the RAUs being deployed on each floor of the building infrastructure.

3. The distributed antenna system of claim 2, wherein the at least one communications downlink and the at least one communications uplink include optical fiber.

4. The distributed antenna system of claim 3, wherein the at least one DDS is comprised from the group consisting of Ethernet, Wireless Local Area Network (WLAN), Worldwide Interoperability for Microwave Access (WiMax), Digital Subscriber Line (DSL), and Long Term Evolution (LTE).

5. The distributed antenna system of claim 2, wherein the ICU is further configured to:
    provide the at least one downlink optical RF communications signal over the at least one communications downlink to the at least one RAU; and
    provide the at least one downlink optical digital signal over the at least one second communications downlink to the at least one RAU.

6. The distributed antenna system of claim 5, wherein the ICU is further configured to:
    receive the at least one uplink optical RF communications signal from the at least one RAU over the at least one communications uplink;
    provide the at least one uplink optical RF communications signal to the HEU;
    receive the at least one uplink optical digital signal from the at least one RAU over the at least one second communications uplink; and
    provide the at least one uplink optical digital signal to the DDS controller.

7. The distributed antenna system of claim 2, further comprising at least one wave-division multiplexer (WDM) configured to wave-division multiplex the at least one downlink optical RF communications signal and the at least one downlink optical digital signal at different wavelengths over at least one optical fiber communications downlink.

8. The distributed antenna system of claim 7, further comprising:
    at least one wave-division de-multiplexer (WDD) associated with the at least one RAU and configured to separate the at least one downlink optical RF communications signal from the at least one downlink optical digital signal received over the at least one communications downlink; and
    at least one wave-division de-multiplexer (WDM) associated with the at least one RAU and configured to wave-division multiplex the at least one uplink optical RF communications signal and the at least one uplink optical digital signal at different wavelengths over the at least one communications uplink.

9. The distributed antenna system of claim 8, further comprising at least one wave-division de-multiplexer (WDD) configured to separate the at least one uplink optical RF communications signal from the at least one uplink optical digital signal received over the at least one communications uplink.

10. The distributed antenna system of claim 7, further comprising at least one frequency-division multiplexer (FDM) configured to frequency-division multiplex the at least one downlink electrical RF communications signal and at least one downlink electrical digital signal at different frequencies over the at least one communications downlink.

11. The distributed antenna system of claim 10, further comprising at least one frequency-division de-multiplexer (FDD) associated with the at least one RAU and configured to separate the at least one downlink electrical RF communications signal from the at least one downlink electrical digital signal from the at least one communications downlink.

12. The distributed antenna system of claim 10, further comprising at least one frequency-division multiplexer (FDM) associated with the at least one RAU and configured to frequency-division multiplex the at least one uplink electrical RF communications signal and the at least one uplink electrical digital signal at different frequencies from the at least one communications uplink.

13. The distributed antenna system of claim 12, further comprising at least one frequency-division de-multiplexer (FDD) configured to separate the at least one uplink electrical RF communications signal from the at least one uplink electrical digital signal from the at least one communications uplink.

14. The distributed antenna system of claim 2, further comprising:
at least one frequency-division multiplexer (FDM) associated with the at least one RAU and configured to frequency-division multiplex the at least one uplink electrical RF communications signal and the at least one uplink electrical digital signal at different frequencies from at least one communications uplink; and
at least one frequency-division de-multiplexer (FDD) configured to separate the at least one uplink electrical RF communications signal from the at least one uplink electrical digital signal from the at least one communications uplink.

15. The distributed antenna system of claim 2, wherein the at least one second communications downlink is comprised of at least one second optical fiber communications downlink.

16. The distributed antenna system of claim 2, wherein each remote antenna unit comprises:
an optical-to-electrical (O-E) converter configured to convert received downlink optical radio frequency (RF) communications signals to downlink electrical RF communications signals and provide the downlink electrical RF communications signals at at least one first port;
an electrical-to-optical (E-O) converter configured to convert uplink electrical RF communications signals received from the at least one first port to uplink optical RF communication signals; and
a digital data services (DDS) interface coupled to at least one second port and configured to:
convert downlink optical digital signals into downlink electrical digital signals to provide to the at least one second port; and
convert uplink electrical digital signals received from the at least one second port into uplink optical digital signals.

17. The distributed antenna system of claim 16, wherein the DDS interface further comprises a power interface configured to receive electrical power and provide the electrical power to the at least one second port, and wherein the at least one second port is configured to support Power-over-Ethernet (PoE).

18. The distributed antenna system of claim 17, wherein the DDS interface is configured to receive the electrical power from an electrical power line provided in at least one array cable.

19. The distributed antenna system of claim 1, wherein each remote antenna unit comprises:
an optical-to-electrical (O-E) converter configured to convert received downlink optical radio frequency (RF) communications signals to downlink electrical RF communications signals and provide the downlink electrical RF communications signals at at least one first port;
an electrical-to-optical (E-O) converter configured to convert uplink electrical RF communications signals received from the at least one first port to uplink optical RF communication signals; and
a digital data services (DDS) interface coupled to at least one second port and configured to:
convert downlink optical digital signals into downlink electrical digital signals to provide to the at least one second port; and
convert uplink electrical digital signals received from the at least one second port into uplink optical digital signals,
wherein the DDS interface further comprises a power interface configured to receive electrical power and provide the electrical power to the at least one second port, and wherein the at least one second port is configured to support Power-over-Ethernet (PoE).

20. A distributed antenna system deployed on multiple floors of a building infrastructure for distributing radio frequency (RF) communications and digital data services (DDS), comprising:
a plurality of remote antenna units (RAUs), at least two of the RAUs being deployed on at least two different floors of the building infrastructure;
a head-end unit (HEU) configured to:
receive at least one downlink electrical RF communications signal;
convert the at least one downlink electrical RF communications signal into at least one downlink optical RF communications signal to be communicated over at least one communications downlink through at least one interconnect unit (ICU) to at least one of the RAUs;
receive at least one uplink optical RF communications signal over at least one communications uplink from at least one of the RAUs through at least one ICU; and
convert the at least one uplink optical RF communications signal into at least one uplink electrical RF communications signal; and
a DDS controller located separately from the HEU, the DDS controller comprising a media converter and configured to:
receive at least one downlink signal containing at least one DDS;
provide at least one downlink optical digital signal over at least one second communications downlink through at least one ICU to at least one of the RAUs;
receive at least one uplink optical digital signal over at least one second communications uplink from at least one of the RAUs through at least one ICU;
convert the at least one uplink optical digital signal to at least one uplink electrical digital signal;
receive at least one second uplink optical digital signal over the at least one second communications uplink from at least one media controller (MC); and
convert the at least one second uplink optical digital signal to the at least one second uplink electrical digital signal.

21. The distributed antenna system of claim 20, wherein each remote antenna unit comprises:

an optical-to-electrical (O-E) converter configured to convert received downlink optical radio frequency (RF) communications signals to downlink electrical RF communications signals and provide the downlink electrical RF communications signals at least one first port;

an electrical-to-optical (E-O) converter configured to convert uplink electrical RF communications signals received from the at least one first port to uplink optical RF communication signals; and a digital data services (DDS) interface coupled to at least one second port and configured to:

convert downlink optical digital signals into downlink electrical digital signals to provide to the at least one second port; and convert uplink electrical digital signals received from the at least one second port into uplink optical digital signals.

22. The distributed antenna system of claim 20, further comprising:

at least one frequency-division multiplexer (FDM) associated with the at least one RAU and configured to frequency-division multiplex the at least one uplink electrical RF communications signal and the at least one uplink electrical digital signal at different frequencies from the at least one communications uplink; and at least one frequency-division de-multiplexer (FDD) configured to separate the at least one uplink electrical RF communications signal from the at least one uplink electrical digital signal from the at least one communications uplink.

* * * * *